US011934126B2

United States Patent

(12) United States Patent
Ishigaya et al.

(10) Patent No.: US 11,934,126 B2
(45) Date of Patent: Mar. 19, 2024

(54) HEATING DEVICE, FIXING DEVICE, AND IMAGE FORMING APPARATUS

(71) Applicants: Yasunori Ishigaya, Kanagawa (JP); Keitaro Shoji, Kanagawa (JP); Tomoya Adachi, Kanagawa (JP); Daisuke Hirano, Kanagawa (JP)

(72) Inventors: Yasunori Ishigaya, Kanagawa (JP); Keitaro Shoji, Kanagawa (JP); Tomoya Adachi, Kanagawa (JP); Daisuke Hirano, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/963,195

(22) Filed: Oct. 11, 2022

(65) Prior Publication Data

US 2023/0205118 A1 Jun. 29, 2023

(30) Foreign Application Priority Data

Dec. 27, 2021 (JP) ................................ 2021-212774

(51) Int. Cl.
*G03G 15/20* (2006.01)

(52) U.S. Cl.
CPC . *G03G 15/2053* (2013.01); *G03G 2215/2003* (2013.01)

(58) Field of Classification Search
CPC ........... G03G 15/2017; G03G 15/2039; G03G 15/2042; G03G 15/2046; G03G 15/2053; G03G 15/2064; G03G 2215/2003
See application file for complete search history.

(56) References Cited

U.S. PATENT DOCUMENTS

2002/0018109 A1* 2/2002 Moriya ................ H05B 3/0095 347/156
2007/0116502 A1* 5/2007 Shimizu ............. G03G 15/2064 399/329

(Continued)

FOREIGN PATENT DOCUMENTS

JP 2008-076857 4/2008
JP 2015-038550 2/2015

OTHER PUBLICATIONS

U.S. Appl. No. 17/545,353, filed Dec. 8, 2021, Tomoya Adachi, et al.

(Continued)

*Primary Examiner* — Thomas S Giampaolo, II
(74) *Attorney, Agent, or Firm* — XSENSUS LLP

(57) ABSTRACT

A heating device includes a first rotator, a heater including a base and a heat generator, and a second rotator contacting the first rotator. The heat generator adjacent to the base defines a heat generation area having one edge close to one edge of the base in a longitudinal direction of the base. A length between the one edge of the base and the one edge of the heat generation area is longer than a length between the other edge of the base and the other edge of the heat generation area. The second rotator has one edge close to the one edge of the heat generation area. A length between the one edge of the second rotator and the one edge of the heat generation area is shorter than a length between the other edge of the second rotator and the other edge of the heat generation area.

8 Claims, 15 Drawing Sheets

(56) References Cited

U.S. PATENT DOCUMENTS

| | | | | |
|---|---|---|---|---|
| 2021/0003954 | A1* | 1/2021 | Souda ................ | G03G 15/2064 |
| 2022/0179338 | A1 | 6/2022 | Seshita et al. | |

OTHER PUBLICATIONS

U.S. Appl. No. 17/582,371, filed Jan. 24, 2022, Takayuki Seki, et al.
U.S. Appl. No. 17/692,177, filed Mar. 11, 2022, Hiroyuki Shimada, et al.
U.S. Appl. No. 17/694,719, filed Mar. 15, 2022, Yukimichi Someya, et al.

* cited by examiner

HEATING DEVICE, FIXING DEVICE, AND IMAGE FORMING APPARATUS

CROSS-REFERENCE TO RELATED APPLICATION

This patent application is based on and claims priority pursuant to 35 U.S.C. § 119(a) to Japanese Patent Application No. 2021-212774, filed on Dec. 27, 2021, in the Japan Patent Office, the entire disclosure of which is hereby incorporated by reference herein.

BACKGROUND

Technical Field

Embodiments of the present disclosure generally relate to a heating device, a fixing device, and an image forming apparatus.

Related Art

An image forming apparatus such as a copier or a printer includes a fixing device as an example of a heating device. The fixing device heats a sheet bearing an unfixed image to fix the unfixed image onto the sheet.

SUMMARY

This specification describes an improved heating device that includes a first rotator, a heater to heat the first rotator, and a second rotator. The heater includes a base and a heat generator. The base has one edge and the other edge in a longitudinal direction of the base. The heat generator is adjacent to the base and defines a heat generation area. The heat generation area has one edge and the other edge in the longitudinal direction. The one edge of the heat generation area is closer to the one edge of the base than to the other edge of the heat generation area. The heater has a length between the one edge of the base and the one edge of the heat generation area in the longitudinal direction longer than a length between the other edge of the base and the other edge of the heat generation area in the longitudinal direction. The second rotator contacts an outer circumferential surface of the first rotator to form a nip. The second rotator has one edge and the other edge in the longitudinal direction. The one edge of the second rotator is closer to the one edge of the heat generation area than to the other edge of the second rotator. The second rotator is positioned to have a length between the one edge of the second rotator and the one edge of the heat generation area in the longitudinal direction shorter than a length between the other edge of the second rotator and the other edge of the heat generation area in the longitudinal direction.

This specification also describes a fixing device that includes the heating device.

This specification further describes an image forming apparatus including the heating device.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
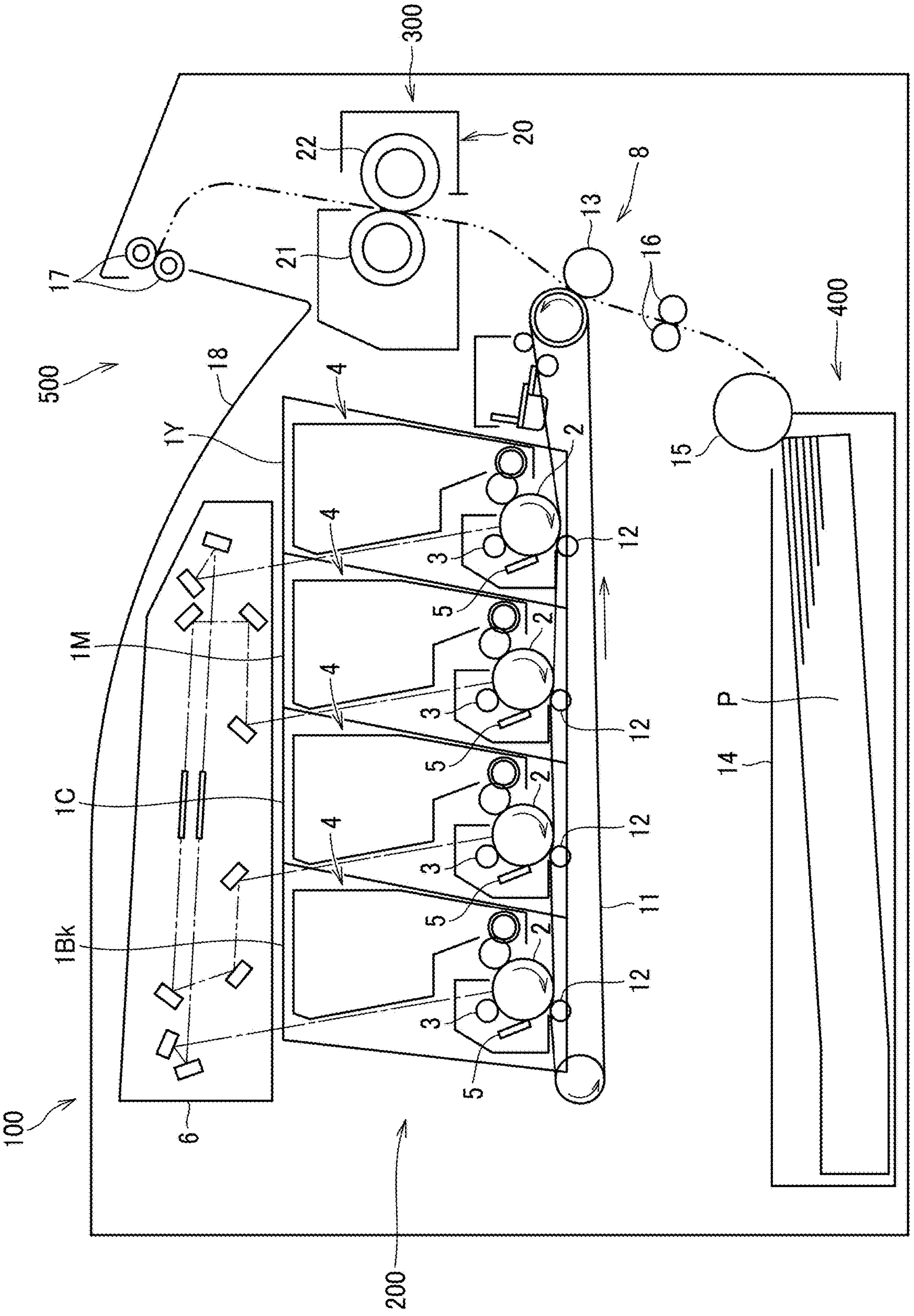
FIG. 1 is a schematic view of an image forming apparatus according to an embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Referring to the attached drawings, the following describes embodiments of the present disclosure. In the drawings for illustrating embodiments of the present disclosure, identical reference numerals are assigned to elements such as members and parts that have an identical function or an identical shape as long as differentiation is possible, and descriptions of such elements may be omitted once the description is provided.

FIG. 1 is a schematic view of an image forming apparatus according to an embodiment of the present disclosure to illustrate a configuration of the image forming apparatus. In the present disclosure, the image forming apparatus may be a copier, a facsimile, a printer, a plotter, multifunctional machines, or multifunction peripherals having a combination of the copier, the facsimile, the printer, and the plotter. The term "image formation" indicates an action for providing (i.e., printing) not only an image having a meaning, such as texts and figures on a recording medium, but also an image having no meaning, such as patterns on the recording medium. Initially, with reference to FIG. 1, a description is given of an overall configuration and operation of an image forming apparatus according to the embodiment of the present disclosure.

As illustrated in FIG. 1, an image forming apparatus 100 according to the present embodiment includes an image forming section 200 to form an image on a sheet-shaped recording medium such as a sheet, a fixing section 300 to fix the image onto the recording medium, a recording medium feeder 400 to feed the recording medium to the image forming section 200, and a recording medium ejection section 500 to eject the recording medium to an outside of the image forming apparatus 100.

The image forming section 200 includes four process units 1Y, 1M, 1C, and 1Bk as image forming units, an exposure device 6 to form an electrostatic latent image on a photoconductor 2 in each of the process units 1Y, 1M, 1C, and 1Bk, and a transfer device 8 to transfer an image onto the recording medium.

The process units 1Y, 1M, 1C, and 1Bk have the same configuration except for containing different color toners (developers), i.e., yellow (Y), magenta (M), cyan (C), and black (Bk) toners, respectively, corresponding to decomposed color separation components of full-color images. Specifically, each of the process units 1Y, 1M, 1C, and 1Bk includes the photoconductor 2 serving as an image bearer bearing the image on the surface thereof, a charger 3 to charge the surface of the photoconductor 2, a developing device 4 to supply the toner as the developer to the surface of the photoconductor 2 to form a toner image, and a cleaner 5 to clean the surface of the photoconductor 2.

The transfer device 8 includes an intermediate transfer belt 11, four primary transfer rollers 12, and a secondary transfer roller 13. The intermediate transfer belt 11 is an endless belt stretched by a plurality of support rollers. The four primary transfer rollers 12 are disposed inside a loop of the intermediate transfer belt 11. Each of the primary transfer rollers 12 is in contact with the corresponding photoconductor 2 via the intermediate transfer belt 11 to form a primary transfer nip between the intermediate transfer belt 11 and each photoconductor 2. The secondary transfer roller 13 is in contact with the outer circumferential surface of the intermediate transfer belt 11 to form a secondary transfer nip.

The fixing section 300 includes a fixing device 20. The fixing device 20 includes a fixing belt 21 that is an endless belt and a pressure roller 22 as an opposed rotator opposite to the fixing belt 21. The fixing belt 21 and the pressure roller 22 are in contact with each other at their outer peripheral surfaces to form a nip (that is, a fixing nip).

The recording medium feeder 400 includes a sheet tray 14 to store sheets P as recording media and a feed roller 15 to feed the sheet P from the sheet tray 14. The "recording medium" is described as a "sheet" in the following embodiments but is not limited to the sheet. Examples of the "recording medium" include not only the sheet of paper but also an overhead projector (OHP) transparency sheet, a fabric, a metallic sheet, a plastic film, and a prepreg sheet including carbon fibers previously impregnated with resin. Examples of the "sheet" include thick paper, a postcard, an envelope, thin paper, coated paper (e.g., coat paper and art paper), and tracing paper, in addition to plain paper.

The recording medium ejection section 500 includes an output roller pair 17 to eject the sheet P to the outside of the image forming apparatus 100 and an output tray 18 to place the sheet P ejected by the output roller pair 17.

Next, printing operations of the image forming apparatus 100 according to the present embodiment are described with reference to FIG. 1.

When the image forming apparatus 100 starts the printing operation, the photoconductors 2 of the process units 1Y, 1M, 1C, and 1Bk and the intermediate transfer belt 11 of the transfer device 8 start rotating. The feed roller 15 starts to rotate and feeds the sheet P from the sheet tray 14. The sheet P fed from the sheet tray 14 is brought into contact with a timing roller pair 16 and temporarily stopped until the image forming section 200 forms the image to be transferred to the sheet P.

Firstly, in each of the process units 1Y, 1M, 1C, and 1Bk, the charger 3 uniformly charges the surface of the photoconductor 2 to a high potential. Next, the exposure device 6 exposes the surface (that is, the charged surface) of each photoconductor 2 based on image data of a document read by a document reading device or print image data sent from a terminal that sends a print instruction. As a result, the potential of the exposed portion on the surface of each photoconductor 2 decreases, and an electrostatic latent image is formed on the surface of each photoconductor 2. The developing device 4 supplies toner to the electrostatic latent image formed on the photoconductor 2, forming the toner image thereon. When the toner images formed on the photoconductors 2 reach the primary transfer nips defined by the primary transfer rollers 12 with the rotation of the photoconductors 2, the toner images formed on the photoconductors 2 are transferred onto the intermediate transfer belt 11 rotated counterclockwise in FIG. 1 successively such that the toner images are superimposed on the intermediate transfer belt 11, forming a full color toner image thereon. Thus, the full color toner image is formed on the intermediate transfer belt 11. The image forming apparatus 100 can form a monochrome toner image by using any one of the four process units 1Y, 1M, 1C, and 1Bk, or can form a bicolor toner image or a tricolor toner image by using two or three of the process units 1Y, 1M, 1C, and 1Bk. After the toner image is transferred from the photoconductor 2 onto the intermediate transfer belt 11, the cleaner 5 removes residual toner that are remained on the photoconductor 2 from the surface of the photoconductor 2.

In accordance with rotation of the intermediate transfer belt 11, the full color toner image transferred onto the intermediate transfer belt 11 reaches the secondary transfer nip defined by the secondary transfer roller 13 and is transferred onto the sheet P conveyed by the timing roller pair 16 at the secondary transfer nip. The sheet P bearing the full color toner image is conveyed to the fixing device 20. In the fixing device 20, the fixing belt 21 and the pressure roller 22 apply heat and pressure to the sheet P to fix the full color toner image onto the sheet P. Thereafter, the sheet P is conveyed to the recording medium ejection section 500 and ejected to the output tray 18 by the output roller pair 17. Thus, a series of printing operations is completed.

Figure 2:
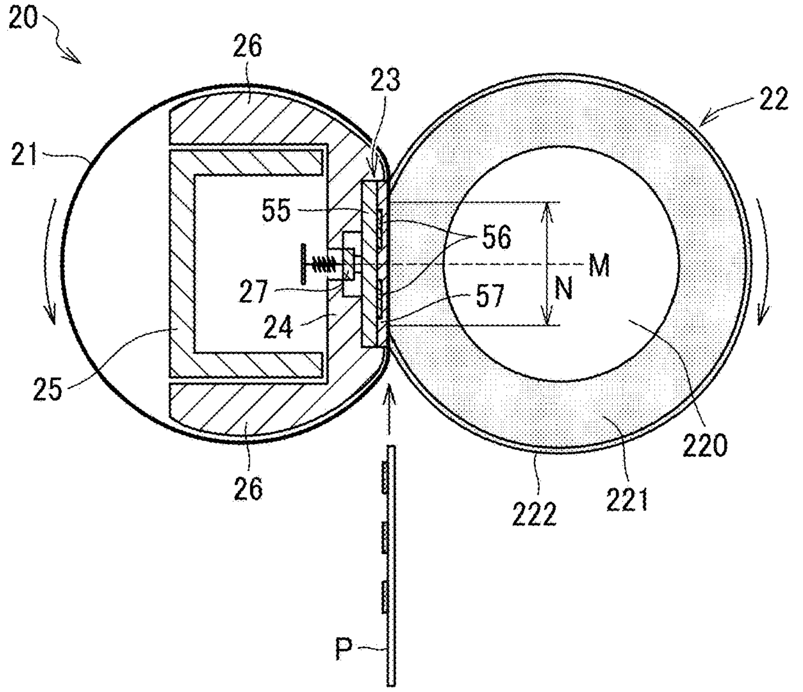
FIG. 2 is a schematic view of a fixing device incorporated in the image forming apparatus of FIG. 1.

Next, with reference to FIG. 2, a description is given of the configuration of the fixing device 20 according to the present embodiment.

As illustrated in FIG. 2, the fixing device 20 according to the present embodiment includes a heater 23, a heater holder 24, a stay 25, a guide 26, and temperature sensors 27 in addition to the fixing belt 21 and pressure roller 22.

The fixing belt 21 is a rotator as a first rotator or a fixing rotator to be in contact with a surface of the sheet P bearing an unfixed toner image and fix the unfixed toner image onto the sheet P. The fixing belt 21 is a flexible endless belt. A loop diameter of the fixing belt 21 is in a range of, for example, from 15 mm to 120 mm. In the present embodiment, the fixing belt 21 has a loop diameter of 25 mm.

Figure 3:
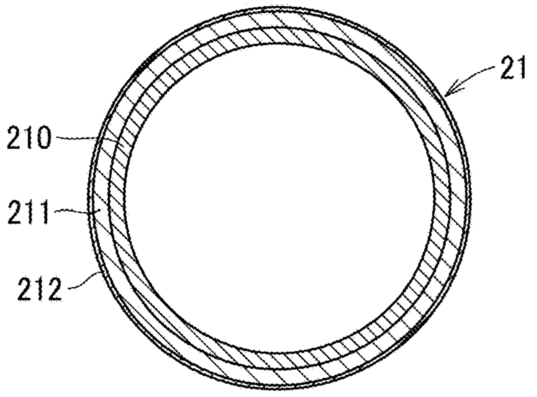
FIG. 3 is a cross-sectional view of a fixing belt according to the embodiment.

As illustrated in FIG. 3, the fixing belt 21 includes a base layer 210, an elastic layer 211, and a release layer 212 successively layered from the inner circumferential surface to the outer circumferential surface and has a total thickness set not greater than 1 mm. The base layer 210 has a thickness in a range of from 30 μm to 50 μm and is made of metal, such as nickel or stainless steel, or resin such as polyimide. The elastic layer 211 has a thickness of 100 μm to 300 μm and is made of rubber such as silicone rubber, silicone rubber foam, or fluoro-rubber. The elastic layer 211 of the fixing belt 21 absorbs slight surface asperities of the fixing belt 21 at the fixing nip formed between the fixing belt 21 and the pressure roller 22, facilitating even heat conduction from the fixing belt 21 to the color toner image T on the sheet P. The release layer 212 of the fixing belt 21 has a thickness in a range of from 10 μm to 50 μm and is made of material such as tetrafluoroethylene-perfluoroalkylvinylether copolymer (PFA), polytetrafluoroethylene (PTFE), polyimide, polyether imide, and polyether sulfone (PES). The release layer 212 of the fixing belt 21 facilitates separation of toner T contained in the toner image formed on the sheet P from the fixing belt 21.

As illustrated in FIG. 2, the pressure roller 22 is a rotator as a second rotator or the opposed rotator and is disposed to face the outer circumferential surface of the fixing belt 21. The pressure roller 22 comes into contact with the fixing belt 21 on the heater 23 to form the fixing nip between the pressure roller 22 and the fixing belt 21.

The pressure roller 22 has, for example, an outer diameter of 25 mm and includes a hollow iron core 220, an elastic layer 221 on the outer circumferential surface of the core 220, and a release layer 222 on the outer circumferential surface of the elastic layer 221. The elastic layer 221 has, for example, a thickness of 3.5 mm and is made of silicone rubber or the like. The release layer 222 has, for example, a thickness of about 40 μm and is made of fluororesin or the like.

The heater 23 is a heat source to heat the inner circumferential surface of the fixing belt 21. The heater 23 is a planar heater extending in a longitudinal direction of the fixing belt 21 (that is, a width direction of the sheet intersecting a sheet conveyance direction). The heater 23 is disposed so as to be in contact with the inner circumferential surface of the fixing belt 21. The heater 23 according to the present embodiment includes a base 55, resistive heat generators 56 disposed on the base 55, and an insulation layer 57 covering the resistive heat generators 56.

Although the resistive heat generators 56 are disposed on the front side of the base 55 facing the pressure roller 22 (in other words, the front side facing the fixing nip N) in the present embodiment, alternatively, the resistive heat generator 56 may be disposed on the back side of the base 55. In this case, since the heat of the resistive heat generators 56 is transmitted to the fixing belt 21 through the base 55, it is preferable that the base 55 be made of a material with high thermal conductivity such as aluminum nitride.

The heater holder 24 is a heat source holder disposed inside the loop of the fixing belt 21 to hold the heater 23. Since the heater holder 24 is subject to temperature increase by heat from the heater 23, the heater holder 24 is preferably made of a heat-resistant material. For example, the heater holder 24 made of a heat-resistant resin having low heat conductivity, such as a liquid crystal polymer (LCP) or polyether ether ketone (PEEK), has a heat-resistant property and reduces heat transfer from the heater 23 to the heater holder 24. As a result, the heater 23 can efficiently heats the fixing belt 21.

The stay 25 supports the heater holder 24. The stay 25 supports a stay side face of the heater holder 24 extending in the longitudinal direction of the fixing belt 21. The stay side face is opposite a nip side face of the heater holder 24. The nip side face faces the pressure roller 22. Accordingly, the stay 25 prevents the heater holder 24 from being bended by a pressing force of the pressure roller 22. As a result, the fixing nip N having a uniform width is formed between the fixing belt 21 and the pressure roller 22.

The stay 25 is preferably made of an iron-based metal such as steel use stainless (SUS) or steel electrolytic cold commercial (SECC) that is electrogalvanized sheet steel to ensure rigidity.

The guide 26 guides the inner circumferential surface of the fixing belt 21. The guide 26 has a cross-sectional shape including an arc along the inner circumferential surface of the fixing belt 21. The guide 26 has an upstream portion upstream from the heater 23 in a rotation direction of the fixing belt 21 that is a direction indicated by arrow in FIG. 2 and a downstream portion downstream from the heater 23 in the rotation direction. Instead of the upstream portion and the downstream portion, the fixing device may include an upstream guide and a downstream guide. In the present embodiment, the guide 26 is formed integrally with the heater holder 24 but may be formed separately.

The temperature sensor 27 is a temperature detector that detects the temperature of the heater 23. The temperature sensor 27 may be a known temperature sensor such as a thermopile, a thermostat, a thermistor, or a non-contact (NC) sensor. The temperature sensor 27 in the present embodiment is a contact type temperature sensor that is in contact with a stay side face of the heater 23 to detect the temperature of the heater 23. The stay side face of the heater 23 is opposite to a side face of the heater 23 facing pressure roller 22. The temperature sensor 27 is not limited to the contact type temperature sensor. The temperature sensor 27 may be a non-contact type temperature sensor that is disposed not to be in contact with the heater 23 and detects temperature in the vicinity of the heater 23.

The fixing device 20 configured as described above operates as follows.

As illustrated in FIG. 2, as the driver drives and rotates the pressure roller 22, a driving force of the driver is transmitted from the pressure roller 22 to the fixing belt 21, thus rotating the fixing belt 21 in accordance with rotation of the pressure roller 22 by friction between the fixing belt 21 and the pressure roller 22. The heater 23 heats the fixing belt 21. The temperature sensor 27 detects the temperature of the heater 23 at this time, and a controller controls an amount of heat generated by the heater 23 based on the detected temperature. Thus, the controller maintains the temperature of the fixing belt 21 to be a fixing temperature in which the fixing belt 21 can fix the unfixed toner image onto the sheet. The sheet P bearing the unfixed toner image is conveyed to the fixing nip N between the fixing belt 21 and the pressure roller 22, and the fixing belt 21 and the pressure roller 22 apply heat and pressure to the sheet P to fix the unfixed toner image onto the sheet P.

Figure 4:
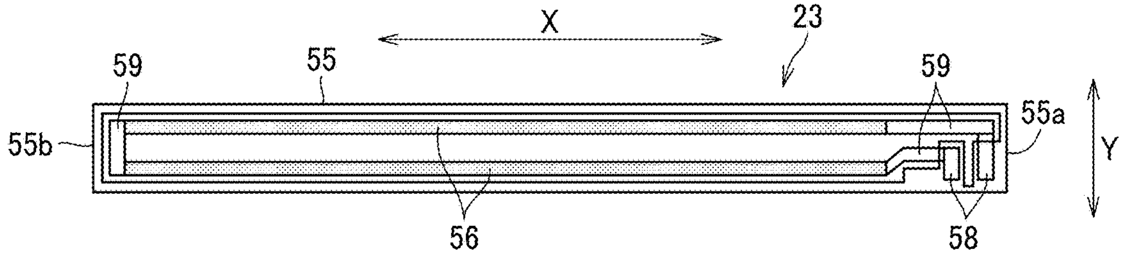
FIG. 4 is a plan view of a heater according to the embodiment.

FIG. 4 is a plan view of the heater according to the present embodiment.

As illustrated in FIG. 4, the heater 23 according to the present embodiment includes the base 55 having a planar shape extending in a direction indicated by arrow X in FIG. 4. The base 55 is disposed so that a longitudinal direction X of the base 55 is in parallel with the longitudinal direction of the fixing belt 21 or an axial direction of the pressure roller 22. On the surface of the base 55, two resistive heat generators 56 extend in the longitudinal direction X of the base 55 and are arranged side by side in a short-side direction Y of the base 55. The "short-side direction" means a direction orthogonal to the longitudinal direction X along the surface of the base 55 on which the resistive heat generators 56 are disposed.

As illustrated in FIG. 4, a pair of electrodes 58 are disposed on one end of the base 55 in the longitudinal direction X. Each electrode 58 is coupled to one end of each resistive heat generator 56 via a power supply line 59.

Each resistive heat generator has the other end that is opposite to the one end coupling to each of the electrodes 58. Another power supply line 59 couples the other ends of the two resistive heat generators 56. The insulation layer 57 covers the resistive heat generators 56 and power supply lines 59 to insulate the resistive heat generators 56 and power supply lines 59 from other parts. On the other hand, the electrodes 58 are not covered with the insulation layer 57 and are exposed so that a connector as a power supply terminal to be described later can be coupled.

The base 55 is made of a material having excellent heat resistance and insulating properties, such as polyimide, glass, mica, or ceramic such as alumina or aluminum nitride. Alternatively, the base 55 may include a metal plate made of metal (that is a conductive material) such as steel use stainless (SUS), iron, or aluminum and an insulation layer formed on the metal plate. In particular, the base 55 including the metal plate made of a high thermal conductive material such as aluminum, copper, silver, graphite, or graphene improves the thermal uniformity of the heater 23 and image quality. The insulation layer 57 is made of a material having excellent heat resistance and insulating properties, such as polyimide, glass, mica, or ceramic such as alumina or aluminum nitride. The resistive heat generator 56 is, for example, produced as below. Silver-palladium (AgPd), glass powder, and the like are mixed to make paste. The paste is screen-printed on the surface of the base 55. Thereafter, the base 55 is subject to firing. Then, the resistive heat generator 56 is produced. The material of the resistive heat generator 56 may contain a resistance material, such as silver alloy (e.g., AgPt) or ruthenium oxide (e.g., $RuO_2$). The electrodes 58 and the power supply lines 59 are formed by screen-printing silver (Ag) or silver-palladium (AgPd).

Figure 5:
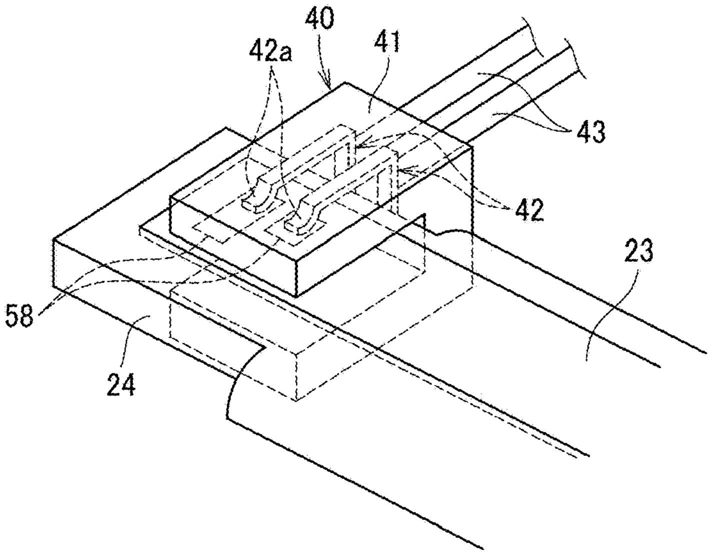
FIG. 5 is a perspective view of a connector coupled to the heater according to the embodiment.

FIG. 5 is a perspective view of a connector 40 as a power supply member coupled to the heater 23.

As illustrated in FIG. 5, the connector 40 includes a housing 41 made of resin, a plurality of contact terminals 42 disposed in the housing 41, and a harness 43 including wires each coupled each contact terminal 42 to supply power. Each contact terminal 42 is configured by an elastically deformable member such as a plate spring.

As illustrated in FIG. 5, the connector 40 is attached to the heater 23 and the heater holder 24 such that the connector 40 sandwiches the heater 23 and the heater holder 24 together. Thus, the connector 40 holds the heater 23 and the heater holder 24 together. In the above-described state, contact portions 42*a* disposed at ends of the contact terminals 42 in the connector 40 elastically contact and press against the electrodes 58 each corresponding to the contact terminals 42 to electrically couple to the electrodes 58 and the contact terminals 42, respectively. As a result, power can be supplied from a power supply disposed in the image forming apparatus to the heater 23 (that is, the resistive heat generators 56) via the connector 40.

Figure 6:
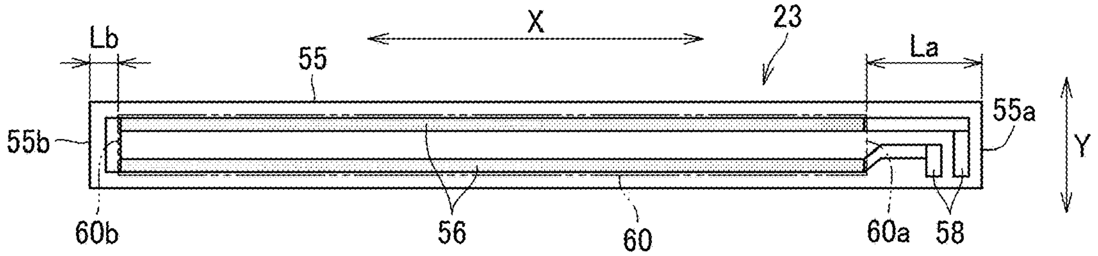
FIG. 6 is a plan view of a heater according to the embodiment.

As illustrated in FIG. 6, the heater 23 according to the present embodiment includes the electrodes 58 disposed on one end of the base 55 in the longitudinal direction X, and no electrode is disposed on the other end of the base 55 in the longitudinal direction X. The above-described configuration needs a space to dispose the electrodes 58 on the one end of the base 55. The space to dispose the electrodes increases a length of a part including the one end of the base 55. In other words, since the heater 23 according to the present embodiment includes the electrodes 58 on one end of the base and no electrode on the other end of the base, a length La between one edge 55*a* of the base 55 and one edge 60*a* of a heat generation area 60 is longer than a length Lb between the other edge 55*b* of the base 55 and the other edge 60*b* of the heat generation area 60 as illustrated in FIG. 4. In the heat generation area 60, the resistive heat generators 56 are disposed. The one edge 55*a* and the one edge 60*a* are adjacent to the electrodes 58. The other edge 55*b* is an edge of the other end of the base 55 that is farther from the electrodes 58 than the one end of the base 55. Hereinafter, the other end of the base 55 is referred to as a non-electrode portion of the base 55. Similarly, the other edge 60*b* of the heat generation area 60 is an edge of the other end of the heat generation area 60 that is farther from the electrodes 58 than the one end of the heat generation area 60. Hereinafter, the other end of the heat generation area 60 is referred to as a non-electrode portion of the heat generation area 60. The heat generation area in the above is not an area in which one resistive heat generator 56 is disposed. The heat generation area in the above description and the following description is an area from one ends of the resistive heat generators 56 on the base 55 to the other ends of the resistive heat generators 56 on the base 55.

In the above-described heater 23 including the base 55 having the one end longer than the other end in the longitudinal direction X, when the heater 23 generates the heat, an amount of heat transferred to the one end of the base 55 is larger than an amount of heat transferred to the other end of the base 55. In other words, the amount of heat transferred to the one end of the base 55 including the electrodes 58 is larger than the amount of heat transferred to the other end of the base 55 including the non-electrode portion of the base 55. As a result, a temperature in a part of the heater, the part near the electrode is relatively lower than a temperature in a part of the heater, the part near the non-electrode portion. In particular, the temperature in the part of the heater near the electrode does not easily rise at the beginning of a start-up operation of the fixing device after the image forming apparatus is powered on because the temperature of the fixing device is low. As a result, a nonuniform temperature distribution in the fixing belt occurs and may cause difficulty in uniformly heating the sheet passing through the fixing nip. In the present embodiment, the following measures are taken in order to reduce a temperature difference in the fixing device.

Figure 7:
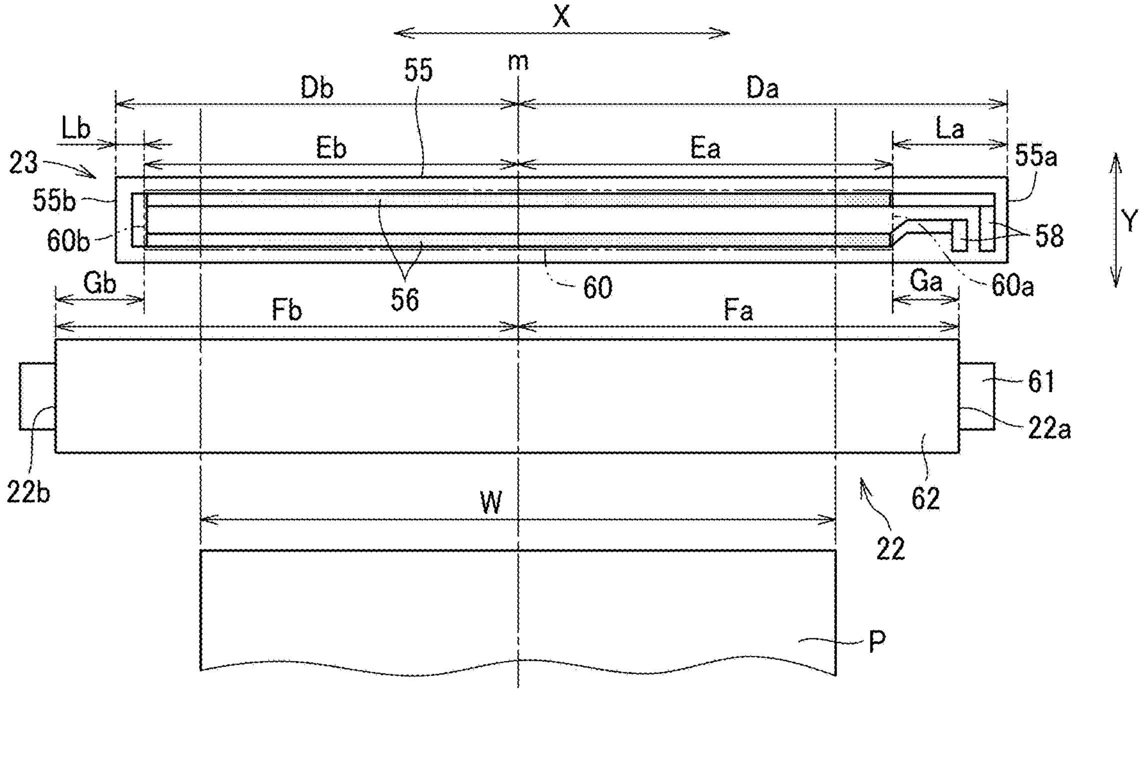
FIG. 7 is a diagram illustrating a configuration according to a first embodiment of the present disclosure.

FIG. 7 is a diagram illustrating the configuration of the fixing device 20 according to a first embodiment. FIG. 7 illustrates the heater 23 and the pressure roller 22 that are included in the fixing device, and a maximum sheet-passing region W through which a sheet P having a maximum width passes. In FIG. 7, the fixing belt and the like are omitted.

As illustrated in FIG. 7, the heat generation area 60 of the heater 23 is designed to be a region equal to or larger than the maximum sheet-passing region W and laterally symmetric with respect to the center m of the maximum sheet-passing region W in the width direction of the maximum sheet-passing region W so that the heat generation area 60 can uniformly heat any size of the sheet in the width direction that is a direction orthogonal to a sheet passing direction and the direction along the surface of the sheet. That is, a length Ea and a length Eb in FIG. 7 are designed to be the same length (Ea=Eb). The length Ea is a length from the center m of the maximum sheet-passing region W in the width direction to the edge 60*a* of the heat generation area 60 adjacent to the electrodes 58. The length Eb is a length from the center m of the maximum sheet-passing region W in the width direction to the other edge 60*b* of the non-electrode portion of the heat generation area 60. The image forming apparatus in the present embodiment is configured by a so-called center conveyance reference system in which the sheets having various sizes are conveyed so that the center positions of the various sizes of sheets in the width direction pass through a same position in the image forming apparatus. Accordingly, the center m of the maximum sheet-passing region W in the width direction is also each of the centers of sheet-passing regions of the sheets other than the sheet having the maximum width in the width direction.

On the other hand, the base 55 is designed asymmetrically with respect to the center m of the maximum sheet-passing region W in the width direction because the base 55 of the heater 23 has the longer one end adjacent to the electrodes 58 than the other end. That is, a length Da is designed to be longer than a length Db in FIG. 7 (Da>Db). The length Da is a lateral length from the center m of the maximum sheet-passing region W in the width direction to the edge 55*a* adjacent to the electrodes 58 on the base 55. The length Db is a lateral length from the center m of the maximum sheet-passing region W in the width direction to the other edge 55*b* of the non-electrode portion of the base 55. As a result, the amount of heat transferred from the heat generation area 60 to the one end of the base 55 adjacent to the electrodes is larger than the amount of heat transferred to the non-electrode portion of the base 55.

A part of the heat generated in the heat generation area 60 transfers to the base 55 and also transfers to the pressure roller 22 via the fixing belt 21. The amount of heat transferred to the pressure roller 22 affects the temperature distribution of the heater 23 and the temperature distribution of the fixing belt 21. This means that adjusting an amount of heat transferred to one end of the pressure roller 22 adjacent to the electrode and an amount of heat transferred to the other end of the pressure roller 22 adjacent to the non-electrode portion of the base 55 enables adjusting the temperature distribution of the heater 23 and the temperature distribution of the fixing belt 21. Based on the above, the pressure roller 22 in the present embodiment is designed to have the one end shorter than the other end adjacent to the non-electrode portion of the base 55.

That is, as illustrated in FIG. 7, a length Fa is designed to be shorter than a length Fb (Fa<Fb). The length Fa is a lateral length from the center m of the maximum sheet-passing region W in the width direction to one edge 22*a* of the pressure roller 22 adjacent to the electrodes 58. The length Fb is a lateral length from the center m of the maximum sheet-passing region W in the width direction to the other edge 22*b* of the pressure roller 22 adjacent to the non-electrode portion of the base 55. In the above description, the edge of the pressure roller 22 is not an edge of a shaft 61 (that is, the core 220) of the pressure roller 22 supported by bearings. The edge of the pressure roller 22 means an edge of a roller body 62 including the elastic layer and the like.

Since the pressure roller 22 according to the present embodiment has the one end shorter than the other end, that is, the one end adjacent to the electrodes 58 as described above, a length Ga between the one edge 60*a* of the heat generation area 60 adjacent to the electrodes 58 and the one edge 22*a* of the pressure roller 22 adjacent to the electrodes 58 is shorter than a length Gb between the other edge 60*b* of the non-electrode portion of the heat generation area 60 and the other edge 22*b* of the pressure roller 22 adjacent to the non-electrode portion of the base 55 as illustrated in FIG. 7. In the above-described configuration, an amount of heat transferred from the heater 23 to the one end of the pressure roller 22 adjacent to the electrodes 58 is smaller than an amount of heat transferred from the heater 23 to the other end of the pressure roller 22 adjacent to the non-electrode portion of the base 55, which prevents the temperature in the part of the heater near the electrodes 58 from falling. In other words, based on the increase in the amount of heat transferred to the one end of the base 55 adjacent to the electrodes 58, which is caused by the longer one end of the base 55 than the other end of the base 55 (that is, La>Lb), the one end of the pressure roller 22 adjacent to the electrodes 58 in the present embodiment is designed to have a reduced projection amount projecting from the heat generation area 60 (that is, Ga<Gb) to reduce the amount of heat transferred to the one end of the pressure roller 22 adjacent to the electrodes 58 to balance the amount of heat transferred from the one end of the heater 23 including the electrodes 58 with the amount of heat transferred from the other end of the heater 23 adjacent to the non-electrode portion of the base 55. As a result, the fixing device in the present embodiment can reduce variations in temperature in the fixing device. The fixing device can prevent the temperature drop in one end of the fixing device around the electrodes and an excessive increase in temperature around the non-electrode portion. As a result, the fixing device according to the present embodiment can improve fixing quality.

The fixing device according to the present embodiment reduces the variations in temperature without setting the heat generation amount different between the one end and the other end in the longitudinal direction of the heater.

Setting the heat generation amount different between the one end and the other end in the longitudinal direction causes disadvantages such as variations in temperature when the heater generates the maximum heat amount and damage to components due to local thermal expansion. The fixing device according to the present embodiment can avoid the above-described disadvantages. As a result, the reliability of the fixing device according to the present embodiment is improved.

Next, other embodiments different from the above-described first embodiment are described. Differences from the first embodiment are mainly described below, and descriptions of other parts similar to the first embodiment are omitted below as appropriate.

Figure 8:
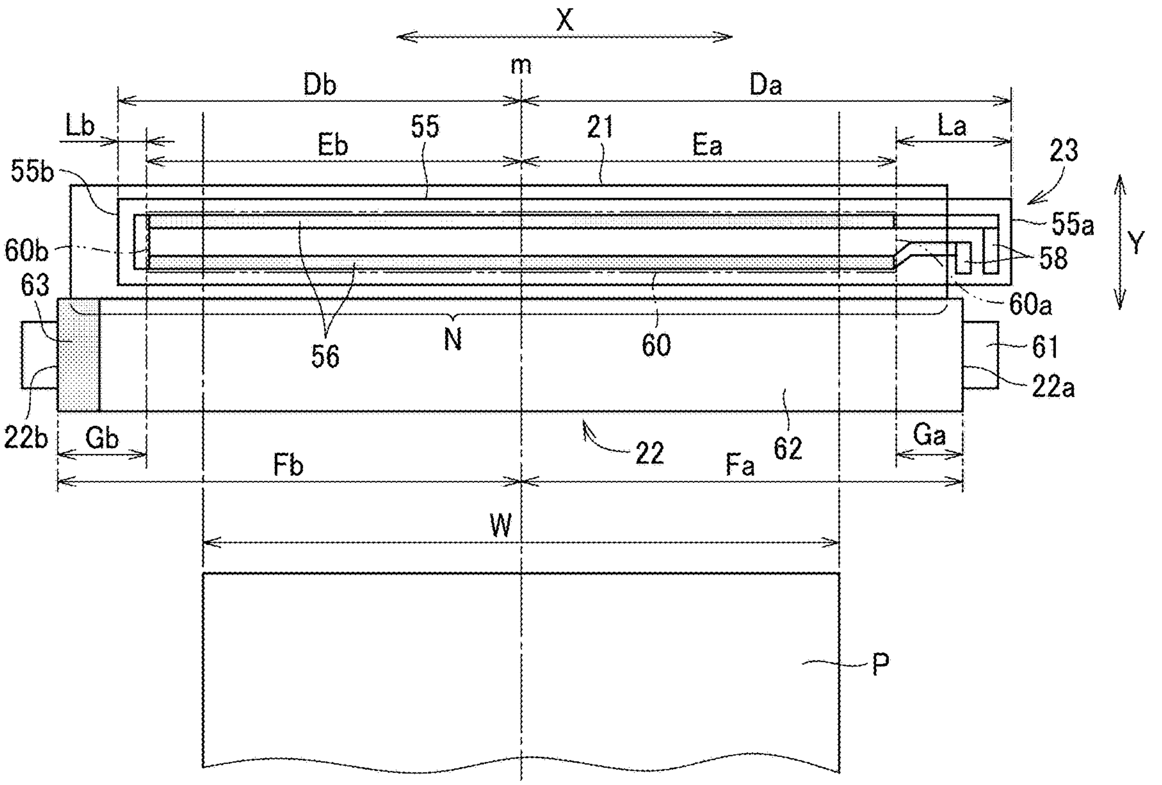
FIG. 8 is a diagram illustrating a configuration according to a second embodiment of the present disclosure.

FIG. 8 is a diagram illustrating a configuration according to a second embodiment of the present disclosure.

In the second embodiment illustrated in FIG. 8, the pressure roller 22 includes a high-friction portion 63 on the other end of the pressure roller 22 adjacent to the non-electrode portion of the base 55. Since the pressure roller 22 includes the high-friction portion 63 on the other end of the pressure roller 22 adjacent to the non-electrode portion, a frictional force between the fixing belt 21 and the pressure roller 22 in a range from the center m of the maximum sheet-passing region W in the width direction to the other edge 22*b* of the pressure roller 22 adjacent to the non-electrode portion of the base 55 (that is, the range including the high-friction portion 63) is larger than a frictional force between the fixing belt 21 and the pressure roller 22 in a range from the center m of the maximum sheet-passing region W in the width direction to the one edge 22*a* of the pressure roller 22 adjacent to the electrodes 58. In other words, the frictional force between the fixing belt 21 and the pressure roller 22 in a range from the center of the fixing belt 21 (that is the same as the center m in FIG. 8) in the longitudinal direction X of the base 55 to an edge of the fixing belt 21 adjacent to the electrodes 58 is smaller than the frictional force between the fixing belt 21 and the pressure roller 22 in a range from the center of the fixing belt 21 in the longitudinal direction X of the base 55 to the other edge of the fixing belt 21 adjacent to the non-electrode portion of the base 55 (that is, the range including the high-friction portion 63). Other than that, the structures according to the second embodiment are those of the above-described first embodiment. The frictional force (F) between the fixing belt and the pressure roller is obtained by the following expression (1) using a friction coefficient (II) between the fixing belt and the pressure roller and a contact pressure (N) of the pressure roller with respect to the fixing belt.

Expression (1)

$$F=\mu\times N \tag{1}$$

The one end of the pressure roller 22 adjacent to the electrodes 58 in the second embodiment is also designed to shorten the one end of pressure roller 22 adjacent to the electrodes 58 based on the increase in the amount of heat transferred to the one end of the base 55, which is caused by the longer one end of the base 55 than the other end of the base (that is, La>Lb), to balance the amount of heat transferred from the one end of the heater 23 including the electrodes 58 with the amount of heat transferred from the other end of the heater 23 adjacent to the non-electrode portion of the base 55, which is the same as the first embodiment. Shortening the one end of the pressure roller 22 adjacent to the electrodes 58 reduces a contact area between the one end of the pressure roller 22 and the fixing belt 21 (that is, the contact area of a contact region in the longitudinal direction), which reduces a rotation transmission force between the pressure roller 22 and the fixing belt 21. As a result, the pressure roller 22 may not smoothly rotate the fixing belt 21, and the fixing belt 21 may slip when the sheet passes through the fixing nip.

The pressure roller 22 according to the second embodiment includes the high-friction portion 63 adjacent to the non-electrode portion to generate a large frictional force between the fixing belt 21 and the pressure roller 22 to increase a grip force between the fixing belt 21 and the pressure roller 22. The above-described configuration compensates for the reduction in the rotation transmission force due to the shortening of the one end of the pressure roller 22 adjacent to the electrodes 58, and the pressure roller 22 can satisfactorily rotate the fixing belt 21.

Specifically, removing the release layer 222 (see FIG. 2) as a surface layer on a part of the outer circumferential surface of the elastic layer 221 in the pressure roller 22 and exposing the part of the outer circumferential surface of the elastic layer 221 forms the high-friction portion 63 of pressure roller 22 in the second embodiment. Preferably, the position of the high-friction portion 63 is outside the maximum sheet-passing region W (and near the non-electrode portion of the base 55) so that the high-friction portion 63 can come into contact with the fixing belt 21 regardless of the size of sheet passing through the fixing device (see FIG. 8). The high-friction portion 63 is not limited to being on the surface of the pressure roller 22 and may be on a portion of the surface of the fixing belt 21.

Figure 9:
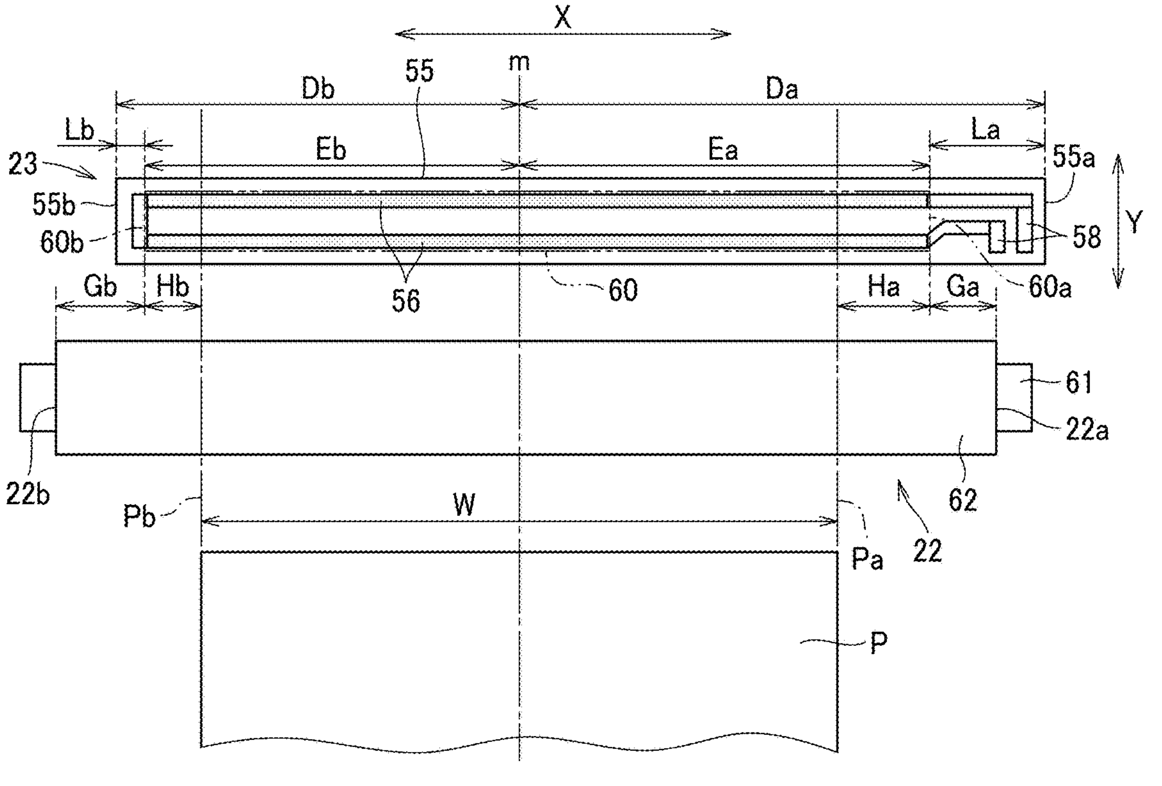
FIG. 9 is a diagram illustrating a configuration according to a third embodiment of the present disclosure.

FIG. 9 is a diagram illustrating a configuration according to a third embodiment of the present disclosure.

The one end of the pressure roller 22 adjacent to the electrodes 58 in the third embodiment illustrated in FIG. 9 is also designed to shorten the one end of pressure roller 22 adjacent to the electrodes 58 based on the increase in the amount of heat transferred to the one end of the base 55, which is caused by the longer one end of the base 55 than the other end of the base 55 (that is, La>Lb), to balance the amount of heat transferred from the one end of the heater 23 including the electrodes 58 with the amount of heat transferred from the other end of the heater 23 adjacent to the non-electrode portion of the base 55, which is the same as the first and second embodiments.

The heat generation area 60 according to the third embodiment has a longer one end adjacent to the electrodes 58 than the one ends in the above-described embodiments to increase the temperature in the one end of the fixing device around the electrodes 58 in which the temperature tends to decrease. Therefore, the heat generation area 60 is not laterally symmetric with respect to the center m of the maximum sheet-passing region W in the width direction of the maximum sheet-passing region W. In the third embodiment, the length Ea is designed to be longer than the length Eb as illustrated in FIG. 9 (Ea>Eb). The length Ea is the length from the center m of the maximum sheet-passing region W in the width direction to the edge 60*a* of the heat generation area 60 adjacent to the electrodes 58. The length Eb is the length from the center m of the maximum sheet-passing region W in the width direction to the other edge 60*b* of the non-electrode portion of the heat generation area 60. As a result, a length Ha is set to be longer than a length Hb in FIG. 9. The length Ha is a length between the edge 60*a* of the heat generation area 60 adjacent to the electrodes 58 and an edge Pa of the maximum sheet-passing region W adjacent to the electrodes 58. The length Hb is a length between the other edge 60*b* of the heat generation area 60 adjacent to the non-electrode portion of the base 55 and an edge Pb of the maximum sheet-passing region W adjacent to the non-electrode portion of the base 55. In the above, the relationship between the lengths of the one end and the other end of the heat generation area 60 in the lateral direction is described with reference to the maximum sheet-passing region W. However, since the image forming apparatus in the third embodiment is configured by the center conveyance reference system, the relationship between the lengths of the one end and the other end of the heat generation area 60 with reference to the maximum sheet-passing region W is the same as the relationship between the lengths of the one end and the other end of the heat generation area 60 with reference to any one of sheet-passing regions having various widths other than the maximum sheet width.

The heat generation area 60 in the third embodiment having the longer one end adjacent to the electrodes 58 than the one ends in the above-described other embodiments can effectively prevent the temperature drop around the electrodes 58 in the fixing device 20. Adding the above-described configuration to the configuration in the above-described each embodiment including the shorter one end of the pressure roller 22 adjacent to the electrodes than the other end of the pressure roller 22 can more effectively prevent the temperature drop around the electrodes 58 in the fixing device 20. In other words, lengthening the one end of the heat generation area 60 adjacent to the electrodes 58 in addition to shortening the one end of the pressure roller 22 adjacent to the electrodes 58 can more effectively prevent the temperature drop around the electrodes 58 in the fixing device 20.

Figure 10:
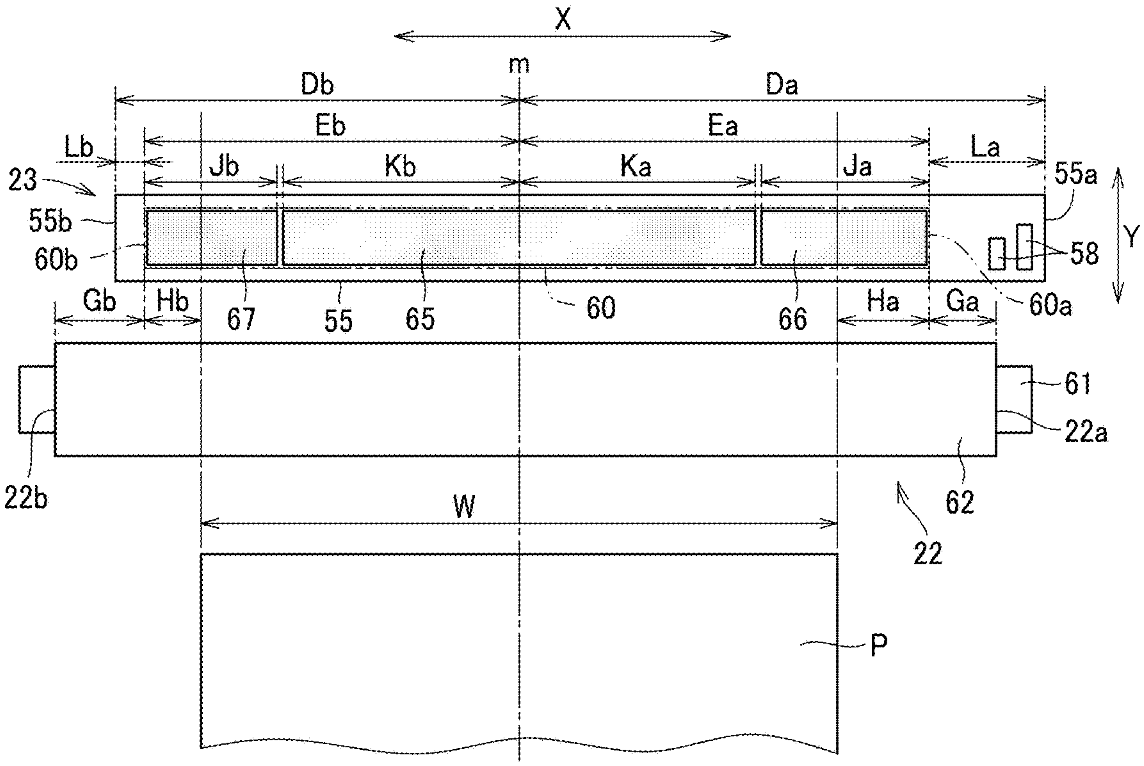
FIG. 10 is a diagram illustrating a configuration according to a fourth embodiment of the present disclosure.

FIG. 10 is a diagram illustrating a configuration according to a fourth embodiment of the present disclosure.

In the fourth embodiment illustrated in FIG. 10, the resistive heat generators are differently configured and arranged from the above-described embodiments. Specifically, the heater 23 according to the fourth embodiment includes a central heat generator 65, a one-side heat generator 66, and an other-side heat generator 67. The central heat generator 65 is disposed so that the center of the central heat generator 65 in the longitudinal direction X is at the center m of the maximum sheet-passing region W in the width direction. The one-side heat generator 66 is disposed adjacent to a one side of the central heat generator 65 in the longitudinal direction X. In other words, the one-side heat generator 66 is adjacent to a right side of the central heat generator 65 in FIG. 10. The other-side heat generator 67 is disposed adjacent to the other side of the central heat generator 65 in the longitudinal direction X. In other words, the other-side heat generator 67 is adjacent to a left side of the central heat generator 65 in FIG. 10. Hereinafter, the one-side heat generator 66 is referred to as an electrode-side heat generator 66 because the one-side heat generator is nearer to the electrodes 58 than the other-side heat generator 67, and the other-side heat generator 67 is referred to as a non-electrode-side heat generator 67 because the other-side heat generator 67 is nearer to the non-electrode portion of the base 55 than the electrode-side heat generator 66. The central heat generator 65, the electrode-side heat generator 66, and the non-electrode-side heat generator 67 are electrically coupled to the electrodes 58, but power supply lines coupling the central heat generator 65, the electrode-side heat generator 66, and the non-electrode-side heat generator 67 to the electrodes 58 are omitted in FIG. 10.

In the present embodiment, the three heat generators that are the central heat generator 65, the electrode-side heat generator 66, and the non-electrode-side heat generator 67 are arranged in the longitudinal direction X of the base 55. The electrode-side heat generator 66 and the non-electrode-side heat generator 67 are at both sides of the central heat generator 65 and configured so as to generate heat independently of the central heater 65. As a result, the above-described configuration can change the heat generation range according to the width of the sheet. For example, when the sheet having a width equal to or smaller than a width of the central heat generator 65 passes through the fixing device 20, the central heat generator 65 generates heat, and the electrode-side heat generator 66 and the non-electrode-side heat generator 67 do not generate heat. When the sheet having a width larger than the width of the central heat generator 65 passes through the fixing device 20, the electrode-side heat generator 66 and the non-electrode-side heat generator 67 in addition to the central heat generator generate heat. Changing the heat generation region in accordance with the width of the sheet passing through the fixing device 20 as described above can prevent an excessive temperature rise in the non-sheet-passing region particularly when the sheets each having a small width pass through the fixing device 20.

The one end of the pressure roller 22 adjacent to the electrodes 58 in the fourth embodiment is also designed to shorten the one end of pressure roller 22 adjacent to the electrodes 58 (that is, Ga<Gb) based on the increase in the amount of heat transferred to the one end of the base 55, which is caused by the longer one end of the base 55 than the other end of the base 55 (that is, La>Lb), to balance the amount of heat transferred from the one end of the heater 23 including the electrodes 58 with the amount of heat transferred from the other end of the heater 23 adjacent to the non-electrode portion of the base 55, which is the same as the first to third embodiments.

In addition, the heat generation area 60 according to the fourth embodiment has the longer one end adjacent to the electrodes 58 than the other end (that is, Ea>Eb) to increase the temperature in the one end of the fixing device around the electrodes 58 in which the temperature tends to decrease. Specifically, setting a length Ja of the electrode-side heat generator 66 in the longitudinal direction X of the base 55 to be longer than a length Jb of non-electrode-side heat generator 67 in the longitudinal direction (Ja>Jb) lengthens the length Ea of the one end of the heat generation area 60 adjacent to the electrodes 58 (Ea>Eb).

The central heat generator 65 has a length Ka from the center m of the maximum sheet-passing region W to one edge near the electrodes 58 and a length Kb from the center m to the other edge near the non-electrode portion of the base 55, and the length Ka is set to be the same length as the length Kb (Ka=Kb). In other words, the central heat generator 65 is disposed to be symmetric with respect to the center m of the maximum sheet-passing region W between the electrodes 58 and the non-electrode portion. Since the central heat generator in the fourth embodiment is disposed to be symmetric with reference to the center m of the maximum sheet-passing region W as described above, non-sheet passing regions outside a sheet passing region of the sheet having a smaller width than the width of the central heat generator 65 have the same lateral heating width. The above-described configuration can prevent temperature in one non-sheet-passing region from excessively rising from temperature in the other non-sheet-passing region and avoid damage to the fixing belt due to a local temperature rise.

Figure 11:
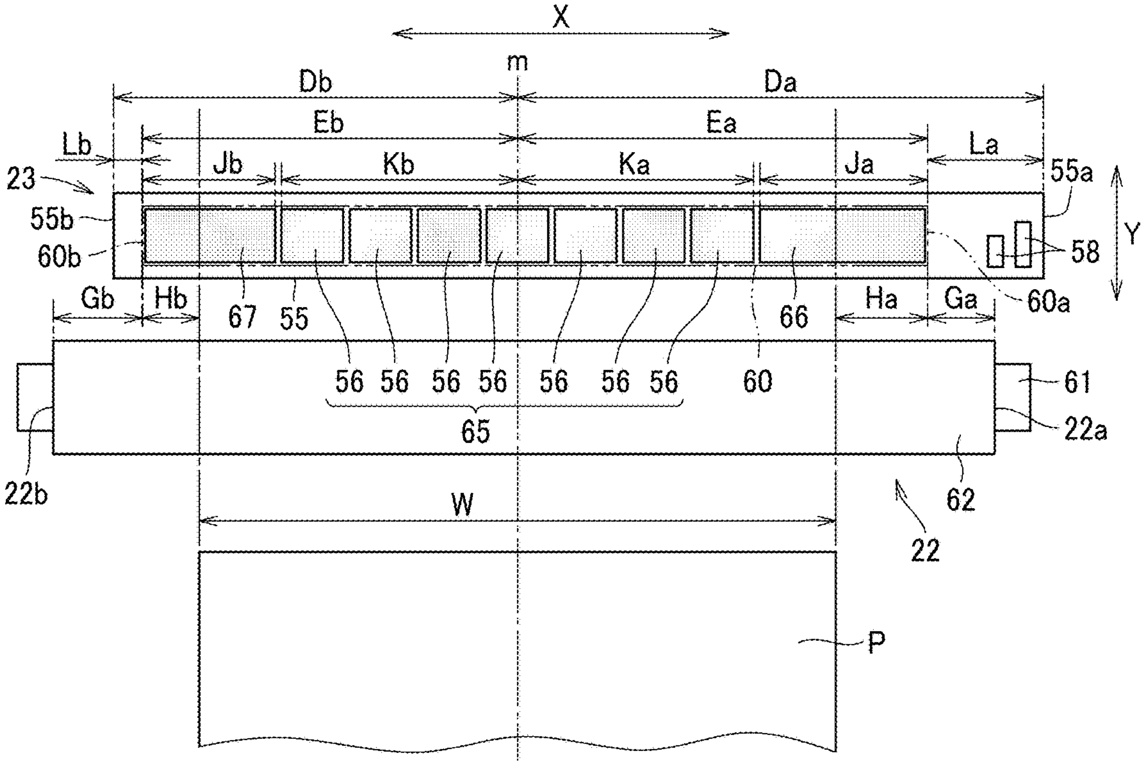
FIG. 11 is a diagram illustrating an example of a central heater configured by a plurality of resistive heat generators.

The central heat generator 65 may be configured by a plurality of resistive heat generators 56 as illustrated in FIG. 11. The resistive heat generators 56 of the central heat generator 65 disposed to be symmetric with reference to the center m of the maximum sheet-passing region W between the electrodes 58 and the non-electrode portion can prevent the excessive temperature rise in the non-sheet-passing regions when the sheets each having the smaller width than the width of the central heat generator 65 pass through the fixing device 20.

In the above-described embodiments in which disposing the electrodes on the one end of the base in the longitudinal direction of the base lengthens the one end of the base in the longitudinal direction, adjusting the lengths of the one end and the other end of pressure roller and the lengths of the one end and the other end of the heat generation area balances the amount of heat generated in the one end of the fixing device with the amount of heat generated in the other end of the fixing device. The present disclosure is not limited to the configuration including the electrodes disposed on the one end of the base and may be applied to the configuration including the electrodes 58 disposed on both ends of the base 55 as illustrated in FIG. 12.

Figure 12:
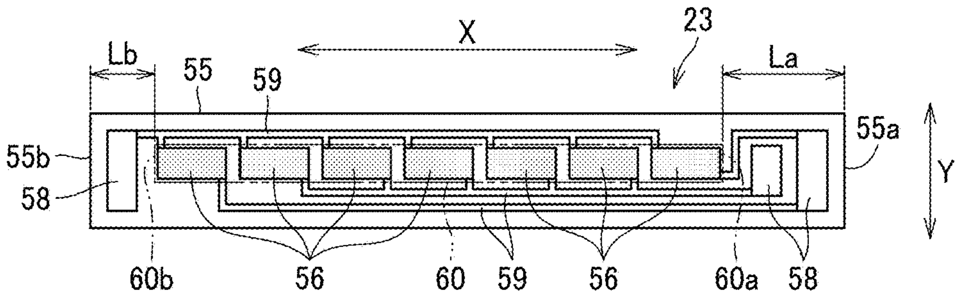
FIG. 12 is a plan view of a heater including electrodes at both ends of a base.

In the example illustrated in FIG. 12, the electrodes 58 are disposed on both ends of the base 55 in the longitudinal direction X, respectively. Two of the electrodes 58 are disposed between the one edge 55*a* of the base 55 and the one edge 60*a* of the heat generation area 60, and the other one of the electrodes 58 is disposed between the other edge 55*b* of the base 55 and the other edge 60*b* of the heat generation area 60. The number of the electrodes 58 disposed on the one edge 55*a* of the base 55 is different from the number of the electrodes 58 disposed on the other edge 55*b* of the base 55.

In the example illustrated in FIG. 12, since the number of the electrodes 58 disposed on the one edge 55*a* of the base 55 is different from the number of the electrodes 58 disposed on the other edge 55*b* of the base 55 as described above, a space on the one end of the base 55 to dispose a relatively large number of the electrodes 58 is larger than a space on the other edge 55*b* to dispose the electrode 58. As a result, the length La between the one edge 55*a* of the base 55 and the one edge 60*a* of the heat generation area 60 is designed so as to be longer than the length Lb between the other edge 55*b* of the base 55 and the other edge 60*b* of the heat generation area 60 in the example illustrated in FIG. 12.

The heater 23 illustrated in FIG. 12 also has the same disadvantage as the heaters of the above-described embodiments in which the amount of heat generated by the heater 23 and transferred to the longer end of the base 55 is larger than the amount of heat generated by the heater 23 and transferred to the shorter end of the base 55. Accordingly, it is preferable to apply the present embodiments to the heater 23 illustrated in FIG. 12. Applying the present embodiments to the heater 23 illustrated in FIG. 12 enables balancing the amount of heat in the one end with the amount of heat in the other end in the longitudinal direction, which reduces variations of the temperatures of the heater and the fixing belt.

The embodiments of the present disclosure are applicable to fixing devices illustrated in FIGS. 13 to 16. The configurations of fixing devices illustrated in FIGS. 13 to 16 are described below.

Figure 13:
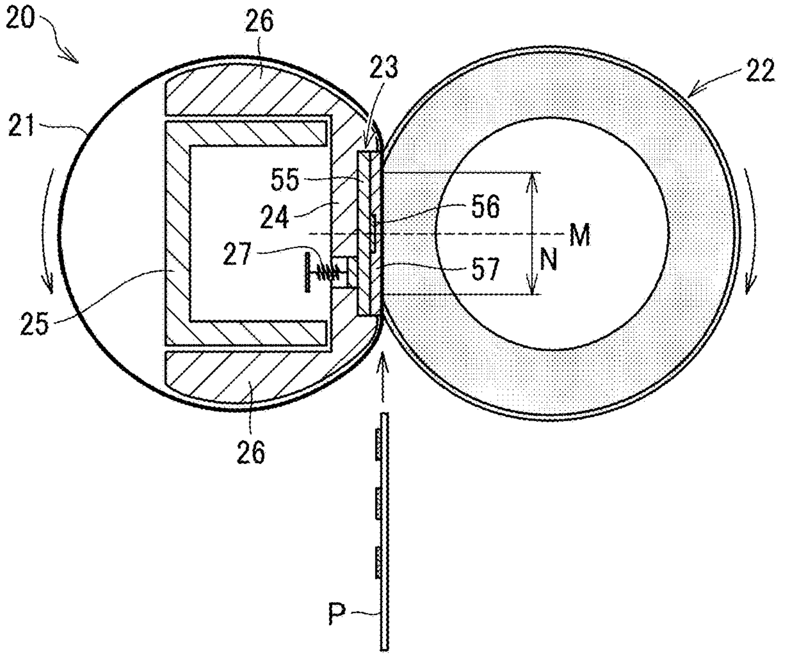
FIG. 13 is a schematic view of a fixing device having a configuration different from the fixing device of FIG. 2.

A different point between the fixing device 20 illustrated in FIG. 13 and the fixing device 20 illustrated in FIG. 2 is the position of the temperature sensor 27 to detect the temperature of the heater 23. Other than that, the configuration illustrated in FIG. 13 is the same as that in FIG. 2. In the fixing device 20 illustrated in FIG. 13, the temperature sensor 27 is disposed upstream from the center M of the fixing nip N in the sheet passing direction (that is, near a nip entrance). In the fixing device 20 illustrated in FIG. 2, the temperature sensor 27 is disposed at the center M of the fixing nip N. The temperature sensor 27 disposed upstream from the center M of the fixing nip N in the sheet passing direction as illustrated in FIG. 13 can accurately detect the temperature near the nip entrance. Since the sheet P entering the fixing nip N particularly easily take away heat of the fixing belt 21 in a portion near the nip entrance, the temperature sensor 27 that accurately detects the temperature at the portion near the nip entrance enables ensuring the fixing property of the image and effectively preventing the occurrence of fixing offset (that is, a state in which the toner image cannot be sufficiently heated).

Figure 14:
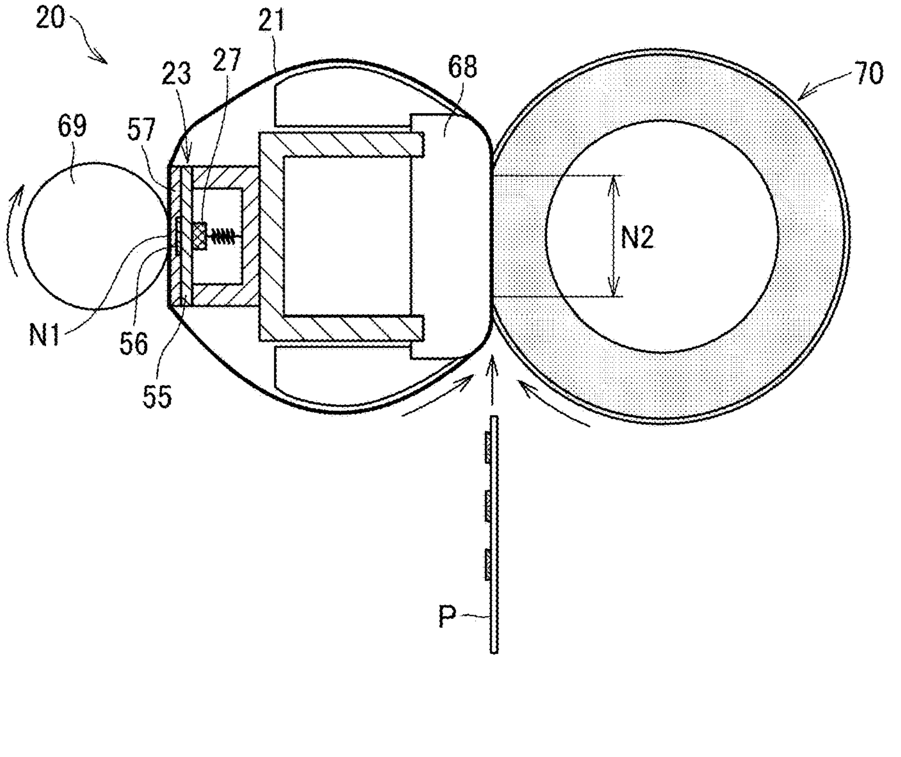
FIG. 14 is a schematic view of a fixing device having a configuration different from the fixing devices of FIGS. 2 and 13.

Next, the fixing device 20 in the embodiment illustrated in FIG. 14 has a heating nip N1 in which the heater 23 heats the fixing belt 21 and a fixing nip N2 through which the sheet P passes, and the heating nip N1 and the fixing nip N2 are formed at different positions. Specifically, the fixing device 20 in the present embodiment includes a nip formation pad 68 inside the loop of the fixing belt 21 in addition to the heater 23. A pressure roller 69 presses the heater 23 via the fixing belt 21 to form the heating nip N1, and a pressure roller 70 presses the nip formation pad 68 to form the fixing nip N2. In the above-described fixing device 20, the heater 23 heats the fixing belt 21 in the heating nip N1, and the fixing belt 21 applies the heat to the sheet P in the fixing nip N2 to fix the unfixed image onto the sheet P.

Figure 15:
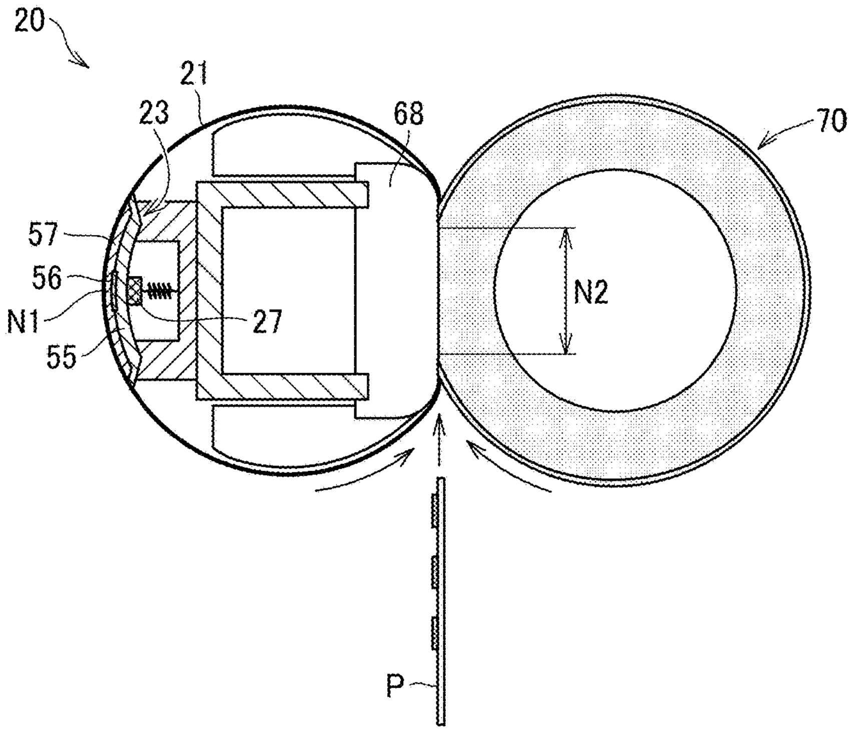
FIG. 15 is a schematic view of a fixing device having a configuration different from the fixing devices of FIGS. 2, 13, and 14.

Next, the fixing device 20 illustrated in FIG. 15 omits the above-described pressure roller 69 adjacent to the heater 23 from the fixing device 20 illustrated in FIG. 14 and includes the heater 23 formed to be arc having a curvature of the fixing belt 21. The other configuration is the same as the configuration illustrated in FIG. 14. In this case, the arc shaped heater 23 surely maintains a length of the contact between the fixing belt 21 and the heater 23 in a belt rotation direction to efficiently heat the fixing belt 21.

Figure 16:
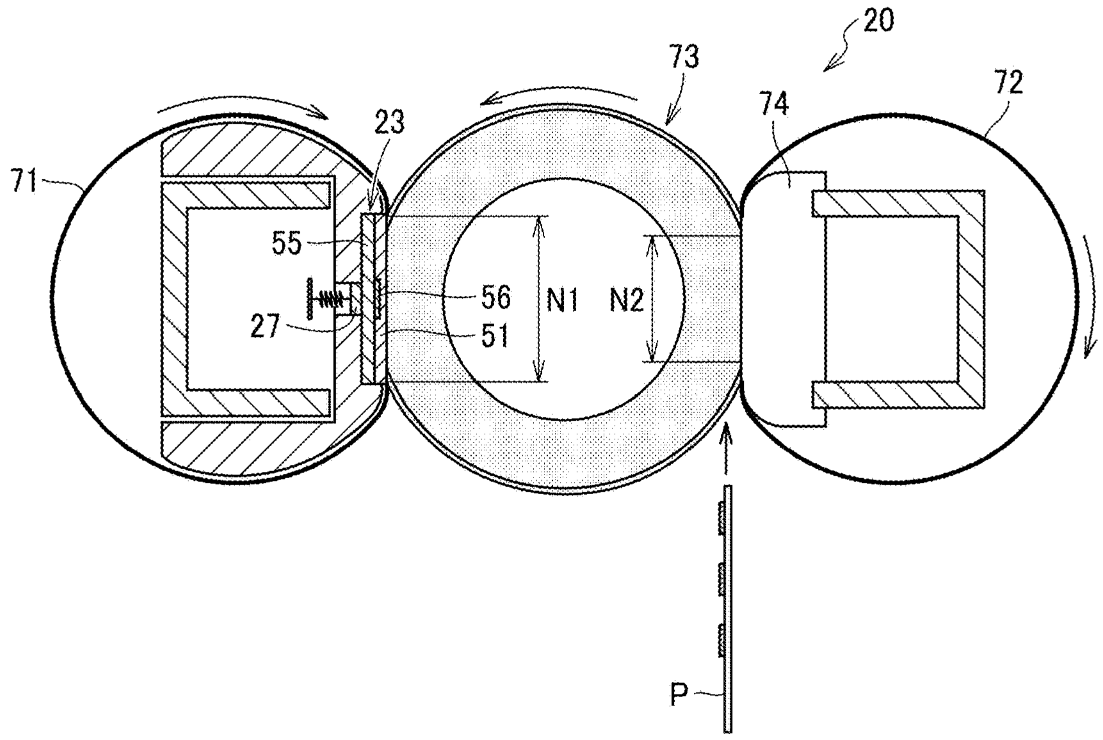
FIG. 16 is a schematic view of a fixing device having a configuration different from the fixing devices of FIGS. 2 and 13 to 15.

Next, the fixing device 20 illustrated in FIG. 16 includes a pair of belt 71 and 72 and a roller 73 disposed between a pair of belts 71 and 72. In this example, the fixing device 20 includes the heater 23 disposed inside the loop of the belt 71 on the left side in FIG. 16 and a nip formation pad 74 disposed inside the loop of the belt 72 on the right side in FIG. 16. The heater 23 is in contact with the roller 73 via the left belt 71, and the nip formation pad 74 is in contact with the roller 73 via the right belt 72, thereby forming the heating nip N1 and the fixing nip N2.

Figure 17:
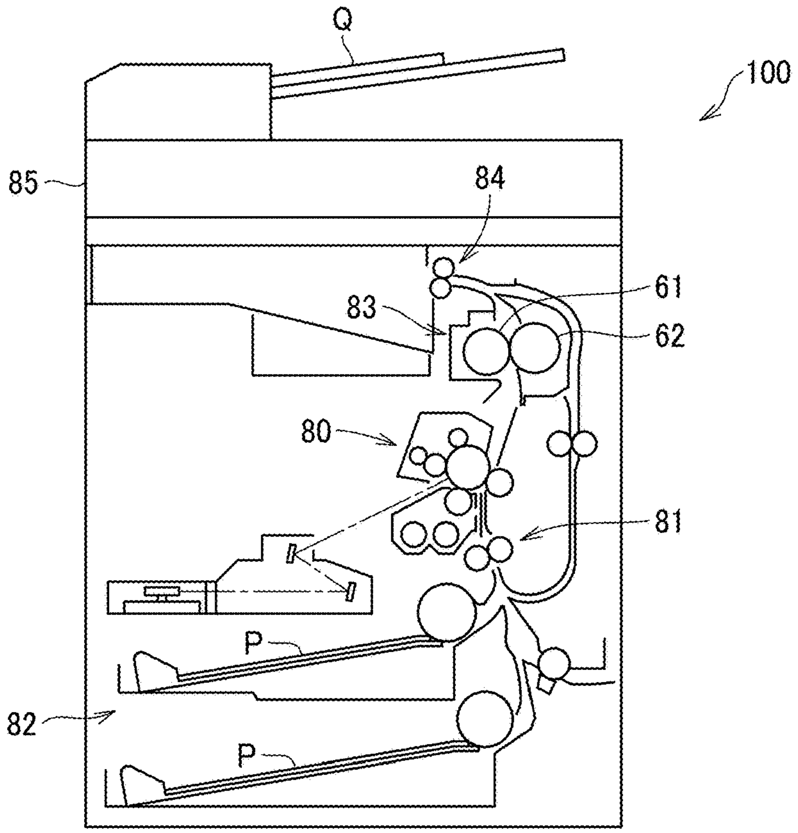
FIG. 17 is a schematic view of an image forming apparatus having a configuration different from the image forming apparatus of FIG. 1.

The image forming apparatus according to the present embodiments is not limited to the color image forming apparatus illustrated in FIG. 1 and may be applied to an image forming apparatus having a configuration illustrated in FIG. 17. The following describes another embodiment of the image forming apparatus that may be applied to the present embodiments.

The image forming apparatus 100 illustrated in FIG. 17 includes an image forming device 80 including a photoconductor drum and the like, a sheet conveyer including a timing roller pair 81 and the like, a sheet feeder 82, a fixing device 83, a sheet ejection device 84, and a reading device 85. The sheet feeder 82 includes a plurality of sheet feeding trays, and the sheet feeding trays stores sheets of different sizes, respectively.

The reading device 85 reads an image of a document Q. The reading device 85 generates image data from the read image. The sheet feeder 82 stores the plurality of sheets P and feeds the sheet P to the conveyance path. The timing roller pair 81 conveys the sheet P on the conveyance path to the image forming device 80.

The image forming device 80 forms a toner image on the sheet P. Specifically, the image forming device 80 includes the photoconductor drum, a charging roller, the exposure device, the developing device, a supply device, a transfer roller, the cleaning device, and a discharger. The fixing device 83 heats and presses the toner image to fix the toner image on the sheet P. Conveyance rollers convey the sheet P on which the toner image has been fixed to the sheet ejection device 84. The sheet ejection device 84 ejects the sheet P to the outside of the image forming apparatus 100.

Next, the fixing device 83 according to the present embodiment is described with reference to FIG. 18. In the configuration illustrated in FIG. 18, components common to those of the fixing device 20 of the above-described embodiment illustrated in FIG. 2 are denoted by the same reference numerals, and a description thereof will be omitted.

Figure 18:
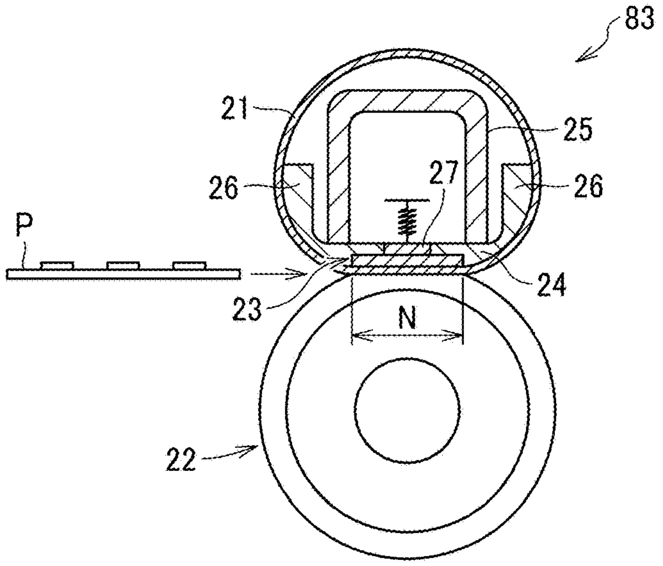
FIG. 18 is a schematic view of a fixing device illustrated in FIG. 17.

As illustrated in FIG. 18, the fixing device 83 includes the fixing belt 21, the pressure roller 22, the heater 23, the heater holder 24, the stay 25, and the temperature sensors 27.

The fixing nip N is formed between the fixing belt 21 and the pressure roller 22. The nip width of the fixing nip N is 10 mm, and the linear velocity of the fixing device 83 is 240 mm/s.

The fixing belt 21 includes a polyimide base layer and the release layer and does not include the elastic layer. The release layer is made of a heat-resistant film material made of, for example, fluororesin. The outer loop diameter of the fixing belt 21 is about 24 mm.

The pressure roller 22 includes the core, the elastic layer, and the release layer. The pressure roller 22 has an outer diameter of 24 to 30 mm, and the elastic layer 21*b* has a thickness of 3 to 4 mm.

The heater 23 includes the base, a thermal insulation layer, a conductor layer including the resistive heat generator and the like, and the insulation layer, and is formed to have a thickness of 1 mm as a whole. The width of the heater 23 in the sheet conveyance direction is, for example, 13 mm.

Figure 19:
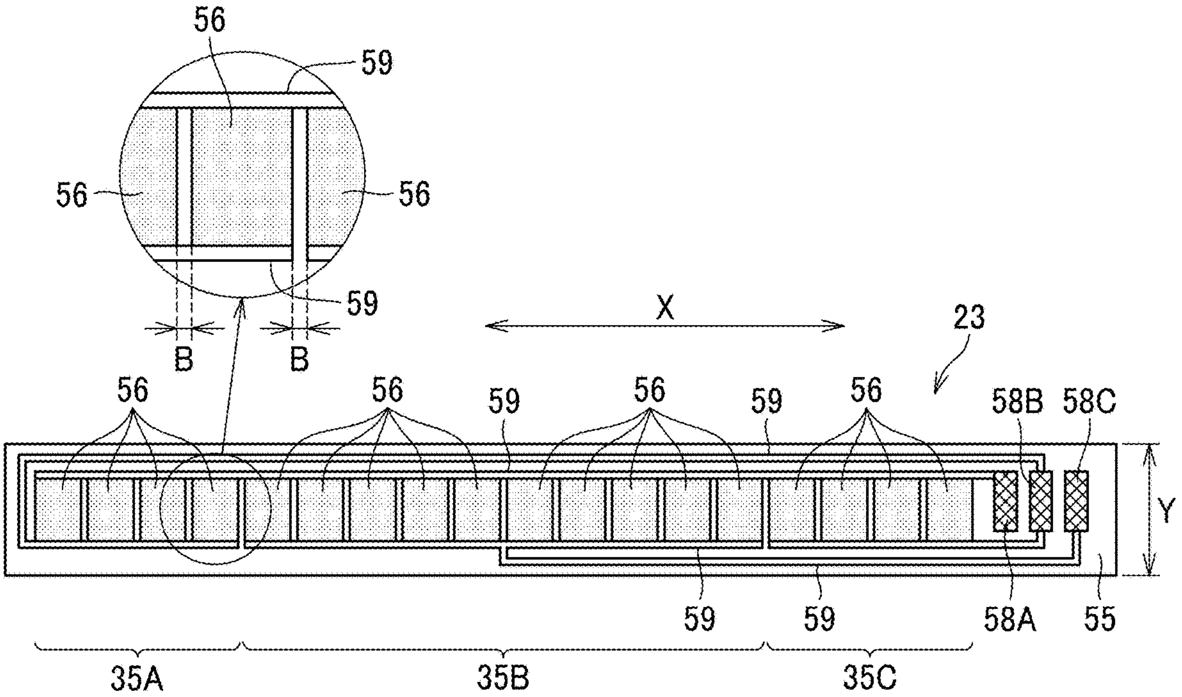
FIG. 19 is a plan view of a heater illustrated in FIG. 18.

As illustrated in FIG. 19, the conductor layer of the heater 23 includes the plurality of resistive heat generators 56, the power supply lines 59, and electrodes 58A to 58C. The plurality of resistive heat generators 56 are arranged at intervals in the longitudinal direction of the heater 23 (that is, the direction indicated by arrow X). The heater 23 has a gap between the neighboring resistive heat generators 56. Hereinafter, the gap is referred to as a separation area B. As illustrated in an enlarged view of FIG. 19, the separation area B is formed between neighboring resistive heat generators of the plurality of resistive heat generators 56. The enlarged view of FIG. 19 illustrates two separation areas B, but the separation area B is formed between the neighboring resistive heat generators of all the plurality of resistive heat generators 56. In FIG. 19, a direction indicated by arrow Y is a direction intersecting or orthogonal to the longitudinal direction X of the heater 23, which is referred to as a longitudinal intersecting direction. The longitudinal intersecting direction is different from a thickness direction of the base 55.

In addition, the direction indicated by arrow Y is the same direction as a direction intersecting an arrangement direction of the plurality of resistive heat generators 56, a short-side direction of the heater 23 along a surface of the base 55 on which the resistive heat generators 56 are disposed, and the sheet conveyance direction of the sheet passing through fixing device.

The heater 23 includes a central heat generation portion 35B and end heat generation portions 35A and 35C at both sides of the central heat generation portion 35B. The central heat generation portion 35B and the end heat generation portions 35A and 35C are configured by the plurality of resistive heat generators 56. The end heat generation portions 35A and 35C can generate heat separately from the central heat generation portion 35B. For example, applying a voltage between the left electrode 58A and the central electrode 58B in FIG. 19 among the three electrodes 58A to 58C causes the end heat generation portions 35A and 35C adjacent to both sides of the central heat generation portion 35B to generate heat. Applying the voltage between the left electrode 58A and the right electrode 58C causes the central heat generation portion 35B to generate heat. When the fixing device fixes the image onto a small sheet, the central heat generation portion 35B generates heat. When the fixing device fixes the image onto a large sheet, all the heat generation portions 35A to 35C generate heat. As a result, the heater in the fixing device can generate heat in accordance with the size of the sheet.

Figure 20:
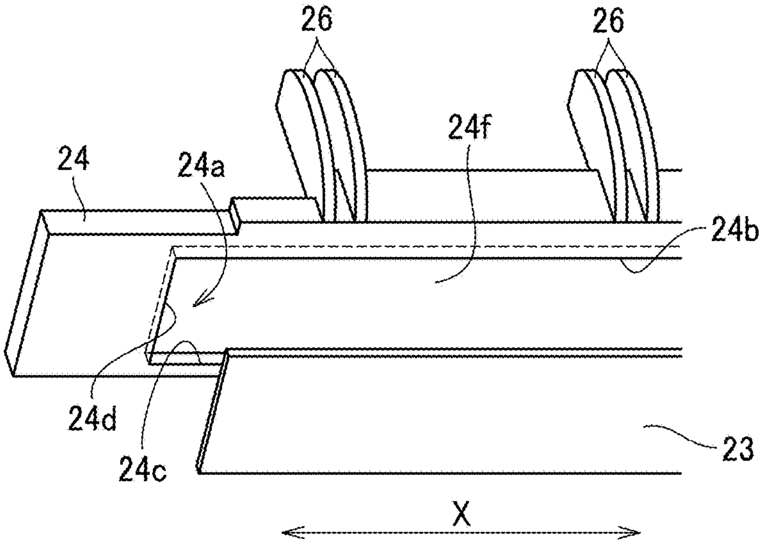
FIG. 20 is a partial perspective view of a heater holder and the heater illustrated in FIG. 18.

As illustrated in FIG. 20, the heater holder 24 according to the present embodiment includes a recessed portion 24*a* to receive and hold the heater 23. The recessed portion 24*a* is formed on the side of the heater holder 24 facing the heater 23. The recessed portion 24*a* has a bottom 24*f* formed in a rectangular shape substantially the same size as the heater 23, and four side walls 24*b*, 24*c*, 24*d*, and 24*e* disposed on four sides of the bottom 24*f*, respectively. In FIG. 20, the right side wall 24*e* is omitted. The recessed portion 24*a* may have an opening that opens toward one end in the longitudinal direction of the heater 23. The opening is configured by removing one of a pair of the left side wall 24*d* and the right side wall 24*e* that intersect the longitudinal direction X of the heater 23 (that is, the arrangement direction of the resistive heat generators 56).

Figure 21:
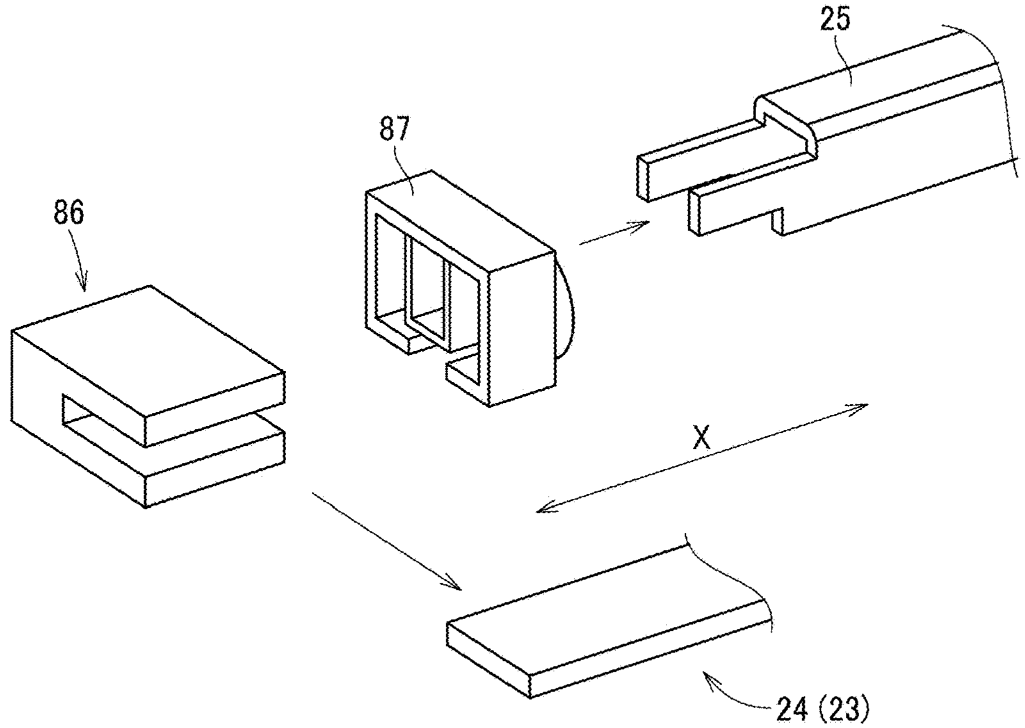
FIG. 21 is a view to illustrate a method of attaching a connector to the heater illustrated in FIG. 18.

As illustrated in FIG. 21, a connector 86 holds the heater 23 and the heater holder 24 according to the present embodiment. The connector 86 includes a housing made of resin such as LCP and a plurality of contact terminals fixed to the inner surface of the housing.

To attach to the heater 23 and the heater holder 24, the connector 86 is moved in the direction intersecting the longitudinal direction X that is the arrangement direction of the resistive heat generators 56 (see a direction indicated by arrow extending from the connector 86 in FIG. 21). The connector 86 is attached to one end of the heater 23 and one end of the heater holder 24 in the longitudinal direction X of the heater 23 that is the arrangement direction of the resistive heat generators 56. The one end of the heater 23 and one end of the heater holder 24 are farther from a portion in which the pressure roller 22 receives a driving force from a drive motor than the other end of the heater 23 and the other end of the heater holder 24, respectively. The connector 86 and the heater holder 24 may have a convex portion and a recessed portion to attach the connector 86 to the heater holder 24. The convex portion disposed on one of the connector 86 and the heater holder 24 is engaged with the recessed portion disposed on the other and relatively move in the recessed portions to attach the connector 86 to the heater holder 24.

After the connector 86 is attached to the heater 23 and the heater holder 24, the heater 23 and the heater holder 24 are sandwiched from the front side and the back side and held by the connector 86. In this state, the contact terminals contact and press against the electrodes of the heater 23, respectively, and the resistive heat generators 56 are electrically coupled to the power supply disposed in the image forming apparatus via the connector 86. As a result, the power supply can supply electric power to the resistive heat generators 56.

A flange 87 illustrated in FIG. 21 is a belt holder. Two flanges 87 are disposed outside both ends of the fixing belt 21 in the longitudinal direction, and inner sides of the flanges 87 are in contact with both ends of the fixing belt 21, respectively to hold the fixing belt 21. The flanges 87 are inserted into both ends of the stay 25 and are fixed to a pair of side plates that are frame members of the fixing device.

Figure 22:
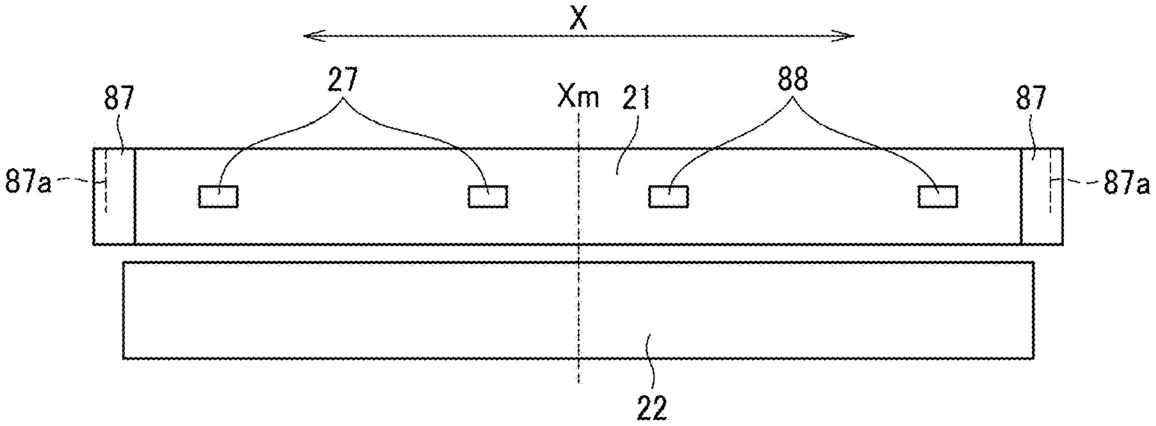
FIG. 22 is a diagram illustrating an arrangement of temperature sensors and thermostats included in the fixing device illustrated in FIG. 17.

FIG. 22 is a diagram illustrating an arrangement of the temperature sensors 27 and thermostats 88 included in the fixing device according to the present embodiment. Each of the thermostats cuts off a current flowing through the resistive heat generators under a certain condition.

As illustrated in FIG. 22, one of the temperature sensors 27 according to the present embodiment is disposed to face the inner circumferential surface of the fixing belt 21 near the center Xm of the fixing belt 21 in the longitudinal direction X of the fixing belt 21, and the other one of the temperature sensor 27 is disposed to face the inner circumferential surface of the fixing belt 21 near the end of the fixing belt 21 in the longitudinal direction X. One of the temperature sensors 27 is disposed at a position corresponding to the separation area B (see FIG. 19) between the resistance heat generators of the heater 23.

In addition, one of the thermostats 88 is disposed to face the inner circumferential surface of the fixing belt 21 near the center Xm of the fixing belt 21, and the other one of the thermostats 88 is disposed to face the inner circumferential surface of the fixing belt 21 near the end of the fixing belt 21. Each thermostat 88 detects the temperature of the inner circumferential surface of the fixing belt 21 or the ambient temperature in the vicinity of the inner circumferential surface of the fixing belt 21. The thermostat 88 cuts off the current flowing to the heater 23 in response to detecting the temperature that exceeds a preset threshold value.

Figure 23:
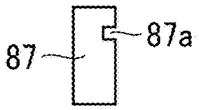
FIG. 23 is a schematic diagram illustrating a groove of a flange illustrated in FIG. 21.

As illustrated in FIGS. 22 and 23, flanges 87 to hold both ends of the fixing belt 21 each have a slide groove 87*a*. The slide groove 87*a* extends in a direction in which the fixing belt 21 moves toward and away from the pressure roller 22. An engaging portion of a housing of the fixing device 9 is engaged with the slide groove 87*a*. The relative movement of the engaging portion in the slide groove 87*a* enables the fixing belt 21 to move toward and away from the pressure roller 22.

The present disclosure is also applicable to the fixing device having the following configuration.

Figure 24:
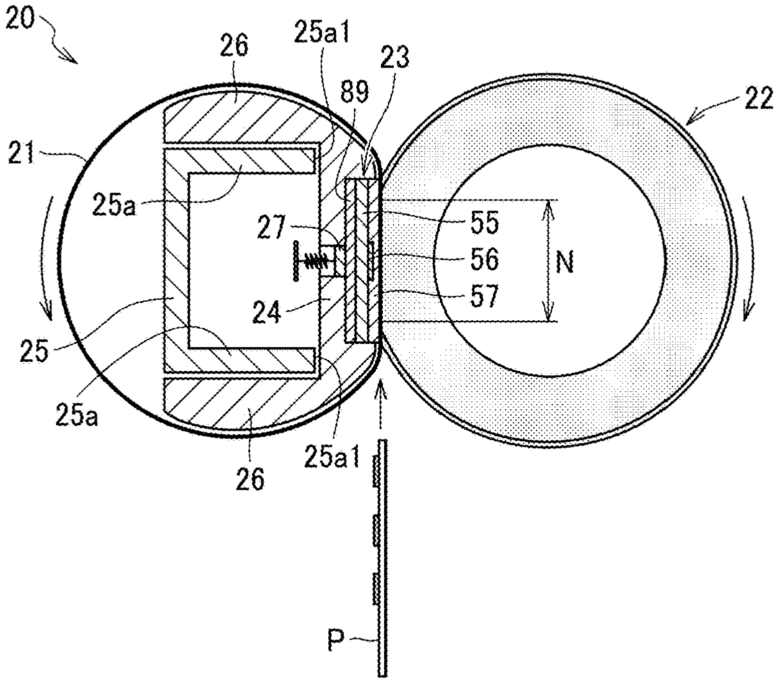
FIG. 24 is a schematic view of a fixing device having a configuration different from the fixing devices of FIGS. 2 and 13 to 16.

FIG. 24 is a schematic view of a fixing device having a different configuration from the fixing devices described above. The above-described embodiments may be applied to the fixing device in FIG. 24.

As illustrated in FIG. 24, the fixing device 20 according to the present embodiment includes the fixing belt 21 as the fixing rotator, the pressure roller 22 as the opposed rotator or the pressure rotator, the heater 23 as the heat source, the heater holder 24 as the heat source holder, the stay 25 as the support, the temperature sensor 27 that is the thermistor as the temperature detector, and a first high thermal conduction member 89. The fixing belt 21 is the endless belt. The pressure roller 22 is in contact with the outer circumferential surface of the fixing belt 21 to form the fixing nip N between the pressure roller 22 and the fixing belt 21. The heater 23 heats the fixing belt 21. The heater holder 24 holds the heater 23.

The stay 25 supports the heater holder 24. The temperature sensor 27 detects the temperature of the first high thermal conduction member 89. That is, the fixing device 20 according to the present embodiment has basically the same configuration as the fixing device illustrated in FIG. 2 except that the fixing device 20 includes the first high thermal conduction member 89. The direction orthogonal to the surface of the paper on which FIG. 24 is drawn is the longitudinal direction of the fixing belt 21, the pressure roller 22, the heater 23, the heater holder 24, the stay 25, and the first high thermal conduction member 89, and this direction is hereinafter simply referred to as the longitudinal direction. The longitudinal direction is also the width direction of the conveyed sheet, the belt width direction of the fixing belt 21, and the axial direction of the pressure roller 22.

The heater 23 in the present embodiment includes the plurality of resistive heat generators 56 arranged at intervals in the longitudinal direction of the heater 23, which is the same as the heater illustrated in FIG. 19. In the heater 23 including the plurality of resistive heat generators 56 arranged at intervals, the temperature of the heater 23 in the separation area B corresponding to the interval between the resistive heat generators 56 tends to be lower than the temperature of the heater 23 in a portion entirely occupied by the resistive heat generator 56. For this reason, the temperature of the fixing belt 21 corresponding to the separation area also becomes low, which may cause an uneven temperature distribution of the fixing belt 21 in the longitudinal direction.

To prevent the above-described temperature drop in the separation area B and reduce the temperature unevenness in the longitudinal direction of the fixing belt 21, the fixing device in the present embodiment includes the first high thermal conduction member 89. Next, a detailed description is given of the first high thermal conduction member 89.

As illustrated in FIG. 24, the first high thermal conduction member 89 is disposed between the heater 23 and the stay 25 in the lateral direction of FIG. 24 and is particularly sandwiched between the heater 23 and the heater holder 24.

One side of the first high thermal conduction member 89 is brought into contact with the back surface of the base 55 of the heater 23, and the other side (that is, the side opposite to the one side) of the first high thermal conduction member 89 is brought into contact with the heater holder 24.

The stay 25 has two vertical portions 25*a* extending in a thickness direction of the heater 23 and each having a contact surface 25*a*1 in contact with the heater holder 24 to support the heater holder 24, the first high thermal conduction member 89, and the heater 23. In the direction intersecting the longitudinal direction that is the vertical direction in FIG. 24, the contact surfaces 25*a*1 are outside the resistive heat generators 56. The above-described structure prevents heat transfer from the heater 23 to the stay 25 and enables the heater 23 to effectively heat the fixing belt 21.

Figure 25:
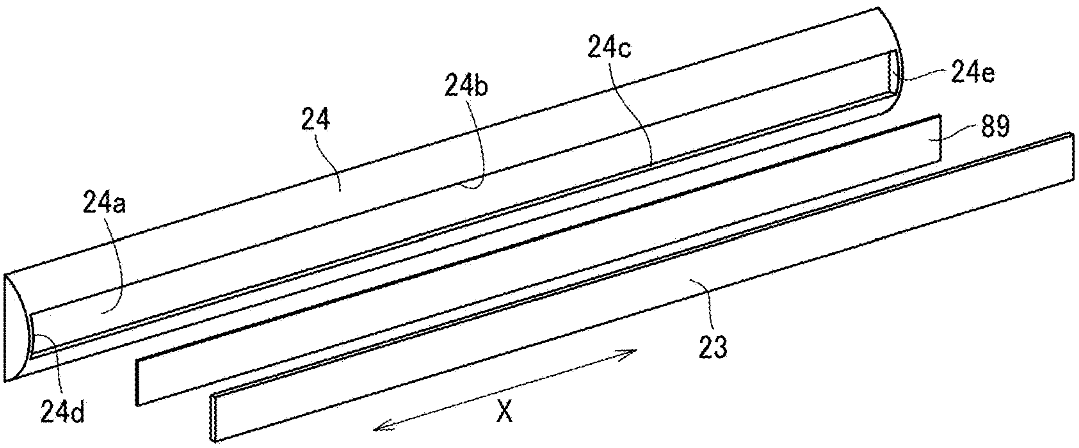
FIG. 25 is a perspective view of a heater, a first high thermal conduction member, and a heater holder that are illustrated in FIG. 24.

As illustrated in FIG. 25, the first high thermal conduction member 89 is a plate having a certain thickness such as 0 3 mm and having, for example, a length of 222 mm in the longitudinal direction, and a width of 10 mm in the direction intersecting the longitudinal direction. In the present embodiment, the first high thermal conduction member 89 is made of a single plate but may be made of a plurality of members. In FIG. 25, the guide 26 illustrated in FIG. 24 is omitted.

The first high thermal conduction member 89 is fitted into the recessed portion 24*a* of the heater holder 24, and the heater 23 is mounted thereon. Thus, the first high thermal conduction member 89 is sandwiched and held between the heater holder 24 and the heater 23. In the present embodiment, the length of the first high thermal conduction member 89 in the longitudinal direction is substantially the same as the length of the heater 23 in the longitudinal direction. Both side walls 24*d* and 24*e* extending in a direction intersecting the longitudinal direction of the recessed portion 24*a* restrict movement of the heater 23 and movement of the first high thermal conduction member 89 in the longitudinal direction and work as longitudinal direction regulators. Reducing a positional deviation of the first high thermal conduction member 89 in the longitudinal direction in the fixing device 9 improves the thermal conductivity efficiency with respect to a target range in the longitudinal direction. Both side walls 24*b* and 24*c* extending in the longitudinal direction of the recessed portion 24*a* restrict movement of the heater 23 and movement of the first high thermal conduction member 89 in the direction intersecting the longitudinal direction and work as direction-intersecting-arrangement-direction regulators.

Figure 26:
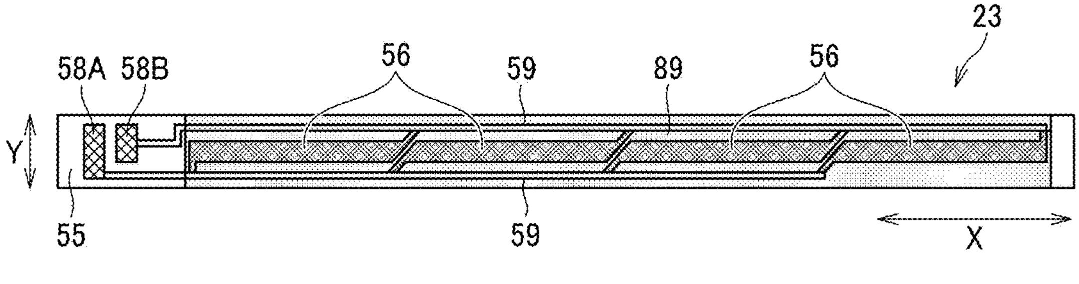
FIG. 26 is a plan view of the heater to illustrate a setting of the first high thermal conduction members.
Figure 27:
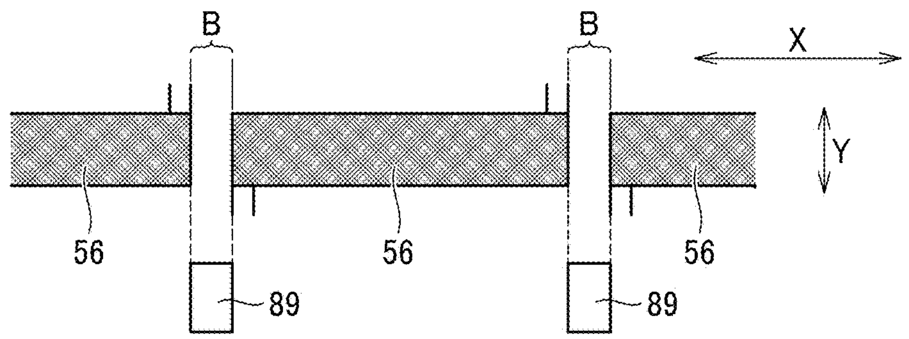
FIG. 27 is a schematic diagram illustrating another example of the setting of the first high thermal conduction members in the heater.
Figure 28:
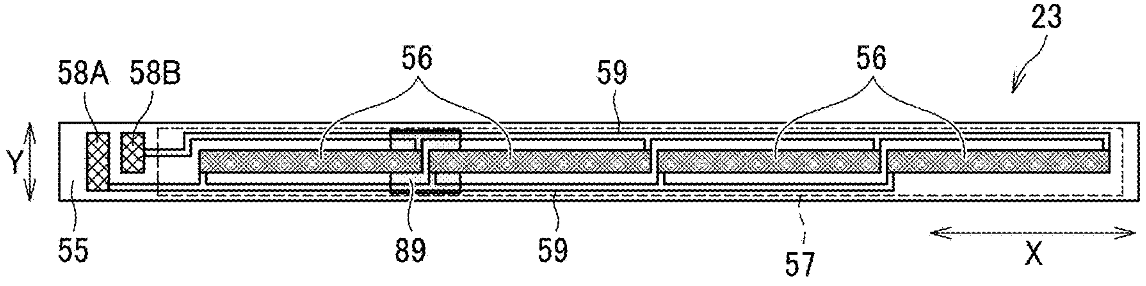
FIG. 28 is a plan view of the heater to illustrate still another example of the setting of the first high thermal conduction member.

The range in which the first high thermal conduction member 89 is disposed in the longitudinal direction indicated by arrow X is not limited to the range illustrated in FIG. 25. For example, as illustrated in FIG. 26, the first high thermal conduction member 89 may be disposed in only a longitudinal range in which the resistive heat generators 56 are disposed (see a hatched portion in FIG. 26). As illustrated in FIG. 27, the first high thermal conduction members 89 may be disposed in only the entire separation areas at positions corresponding to the separation areas (in other words, the gap area) in the longitudinal direction indicated by arrow X. In FIG. 27, for the sake of convenience, the resistive heat generators 56 and the first high thermal conduction members 89 are shifted in the vertical direction of FIG. 27 but are disposed at substantially the same position in the direction intersecting the longitudinal direction indicated by arrow Y. In addition, the first high thermal conduction member 89 may be disposed over a part of the resistive heat generator 56 in the longitudinal intersecting direction indicated by arrow Y, or as in the example illustrated in FIG. 28, may be disposed so as to cover all the resistive heat generators 56 in the longitudinal intersecting direction indicated by arrow Y. As illustrated in FIG. 28, the first high thermal conduction member 89 may be disposed to face a part of each of the neighboring resistive heat generators 56 in addition to the gap area between the neighboring resistive heat generators 56. The first high thermal conduction member 89 may be disposed to face all separation areas B in the heater 23, one separation area B as illustrated in FIG. 28, or some of separation areas B. At least a part of the first high thermal conduction member 89 may be disposed to face the separation area B.

Due to the pressing force of the pressure roller 22, the first high thermal conduction member 89 is sandwiched between the heater 23 and the heater holder 24 and is brought into close contact with the heater 23 and the heater holder 24. Bringing the first high thermal conduction member 89 into contact with the heaters 23 improves the heat conduction efficiency in the longitudinal direction of the heaters 23. The first high thermal conduction member 89 facing the separation area B improve the heat conduction efficiency of a part of the heater 23 facing the separation area B in the longitudinal direction, transmits heat to the part of the heater 23 facing the separation area B, and raise the temperature of the part of the heater 23 facing the separation area B. Thus, the first high thermal conduction member 89 reduces temperature unevenness of the heater 23 in the longitudinal direction and the temperature unevenness of the fixing belt 21 in the longitudinal direction. As a result, the above-described structure prevents fixing unevenness and gloss unevenness in the image fixed on the sheet. Since the heater 23 does not need to generate additional heat to secure sufficient fixing performance in the part of the heater 23 facing the separation area B, energy consumption of the fixing device can be saved. The first high thermal conduction member 89 disposed over the entire area in which the resistive heat generators 56 are arranged in the longitudinal direction improves the heat transfer efficiency of the heater 23 over the entire area of a main heating region of the heater 23 (that is, an area facing an image formation area of the sheet passing through the fixing device) and reduces the temperature unevenness of the heater 23 and the temperature unevenness of the fixing belt 21 in the longitudinal direction.

In addition, the combination of the first high thermal conduction member 89 and the resistive heat generator 56 having a positive temperature coefficient (PTC) characteristic effectively prevents the overheating of a non-sheet passing region (that is the region of the fixing belt outside the small sheet) of the fixing belt 21 when small sheets pass through the fixing device 9. The PTC characteristic is a characteristic in which the resistance value increases as the temperature increases, for example, a heater output decreases under a constant voltage. The resistive heat generator 56 having the PTC characteristic effectively reduces the amount of heat generated by the resistive heat generator 56 in the non-sheet passing region, and the first high thermal conduction member 89 effectively transfers heat from the non-sheet passing region in which the temperature rises to a sheet passing region that is a region of the fixing belt contacting the sheet. As a result, the overheating of the non-sheet passing region is effectively prevented.

Figure 29:
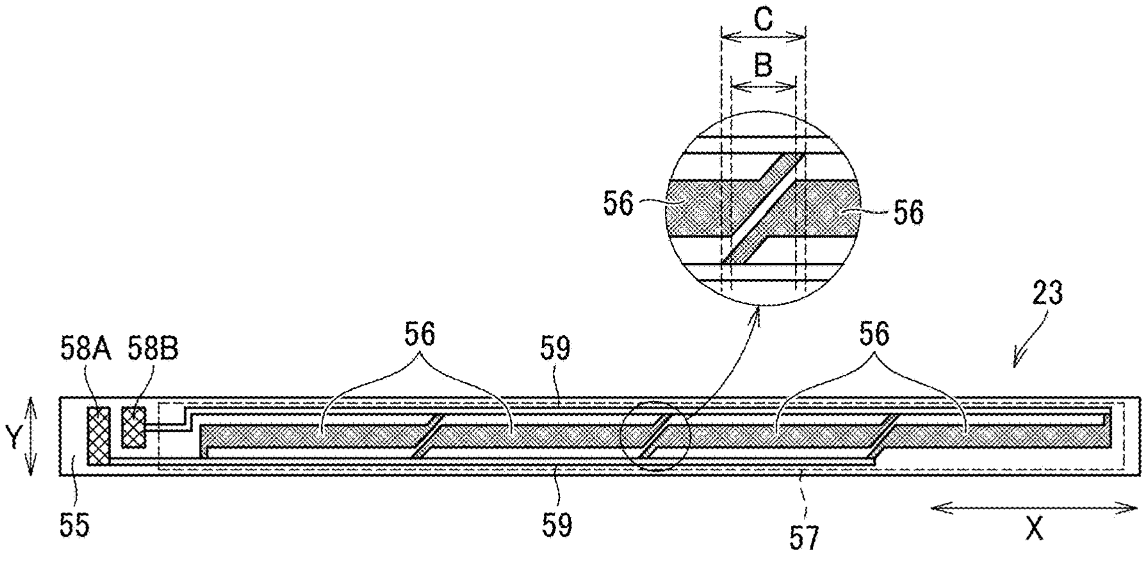
FIG. 29 is a plan view of the heater to illustrate an enlarged separation areas.

The first high thermal conduction member 89 may be disposed opposite an area around the separation area B because the small heat generation amount in the separation area B decreases the temperature of the heater 23 in the area around the separation area B. For example, the first high thermal conduction member 89 facing the enlarged separation area C that includes the separation area and an area around the separation area B as illustrated in FIG. 29 improves the heat transfer efficiency of the separation area B and the area around the separation area B in the longitudinal direction and effectively reduces the temperature unevenness in the longitudinal direction of the heaters 23. The first high thermal conduction member 89 facing the entire region in which all the resistive heat generators 56 are arranged in the longitudinal direction reduces the temperature unevenness of the heater 23 (and the fixing belt 21) in the longitudinal direction.

Next, another embodiment of the fixing device is described.

Figure 30:
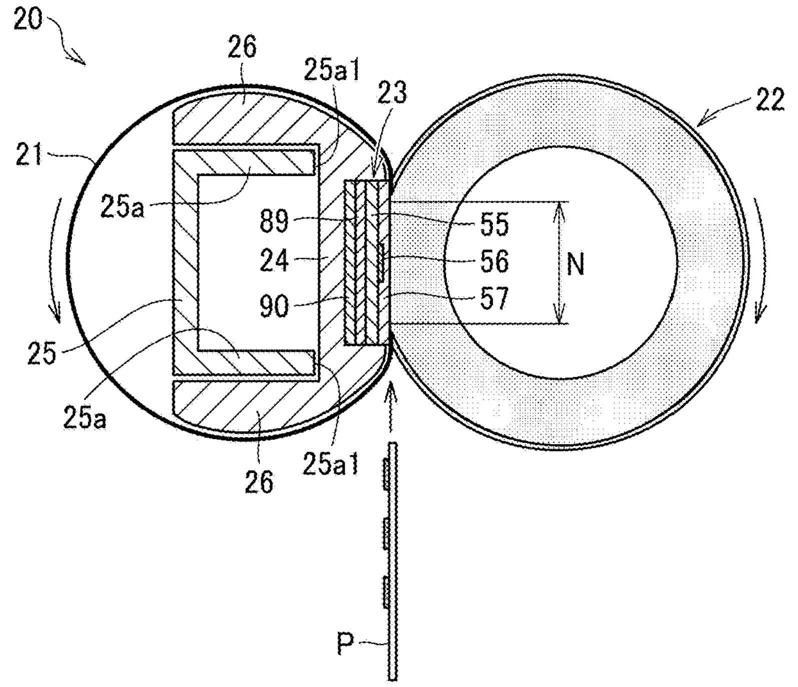
FIG. 30 is a schematic view of a fixing device having a configuration different from the fixing devices of FIGS. 2 and 13 to 16, and 24.

The fixing device 20 illustrated in FIG. 30 includes a second high thermal conduction member 90 between the heater holder 24 and the first high thermal conduction member 89. The second high thermal conduction member 90 is disposed at a position different from the position of the first high thermal conduction member 89 in the lateral direction in FIG. 30 that is a direction in which the heater holder 24, the stay 25, and the first high thermal conduction member 89 are layered. Specifically, the second high thermal conduction member 90 is disposed so as to overlap the first high thermal conduction member 89. The fixing device in the present embodiment includes the temperature sensor 27 (that is, the thermistor), which is the same as the fixing device illustrated in FIG. 24. FIG. 30 illustrates a cross section in which the temperature sensor 27 is not disposed.

The second high thermal conduction member 90 is made of a material having thermal conductivity higher than the thermal conductivity of the base 55, for example, graphene or graphite. in the present embodiment, the second high thermal conduction member 90 is made of a graphite sheet having a thickness of 1 mm. Alternatively, the second high thermal conduction member 90 may be a plate made of aluminum, copper, silver, or the like.

Figure 31:
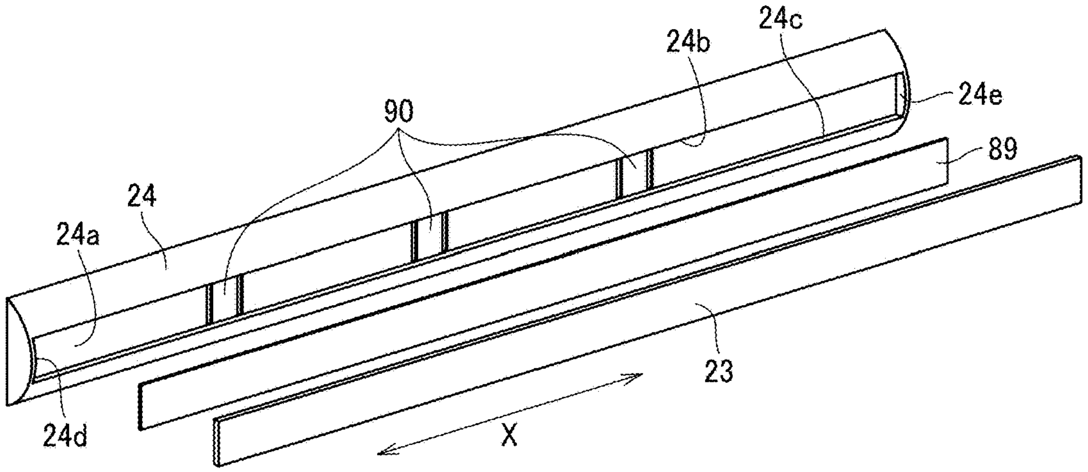
FIG. 31 is a perspective view of the heater, the first high thermal conduction member, and a heater holder that are illustrated in FIG. 30.

As illustrated in FIG. 31, a plurality of second high thermal conduction members 90 are arranged on the recessed portion 24*a* of the heater holder 24 at intervals in the longitudinal direction. The recessed portion 24*a* of the heater holder 24 has a plurality of holes in which the second high thermal conduction members 90 are disposed. Clearances are formed between the heater holder 24 and both sides of the second high thermal conduction member in the longitudinal direction. The clearance prevents heat transfer from the second high thermal conduction member 90 to the heater holder 24, and the heater 23 efficiently heats the fixing belt 21. In FIG. 31, the guide 26 illustrated in FIG. 24 is omitted.

Figure 32:
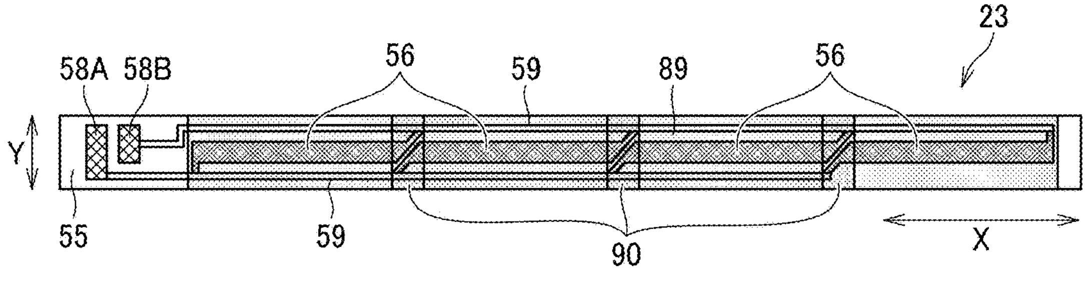
FIG. 32 is a plan view of the heater to illustrate an arrangement of the first high thermal conduction member and the second high thermal conduction member.

As illustrated in FIG. 32, each of the second high thermal conduction members 90 (see the hatched portions) is disposed at a position corresponding to the separation area B in the longitudinal direction indicated by arrow X and faces at least a part of each of the neighboring resistive heat generators 56 in the longitudinal direction. In particular, each of the second high thermal conduction members 90 in the present embodiment faces the entire separation area B. FIG. 32 (and FIG. 34 described below) illustrates the first high thermal conduction member 89 facing the entire region in which all the resistive heat generators 56 are arranged in the longitudinal direction. The range in which the first high thermal conduction member 89 is disposed in the longitudinal direction is not limited to the above.

Figure 33:
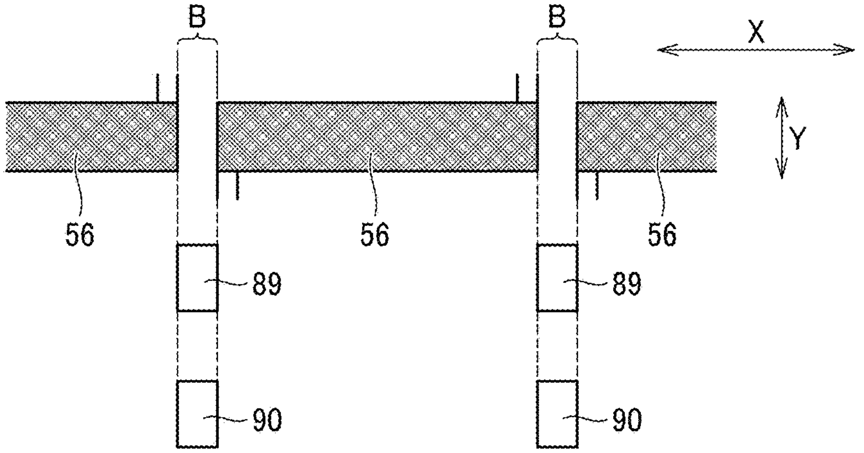
FIG. 33 is a plan view of the heater to illustrate another arrangement of the first high thermal conduction member and the second high thermal conduction member.

The fixing device according to the present embodiment includes the second high thermal conduction member 90 disposed at a position corresponding to the separation area B in the longitudinal direction and the position at which at least a part of each of the neighboring resistive heat generators 56 faces the second high thermal conduction member 90 in addition to the first high thermal conduction member 89. The above-described structure further improves the heat transfer efficiency in the separation area B in the longitudinal direction and more efficiently reduces the temperature unevenness of the heater 23 in the longitudinal direction. As illustrated in FIG. 33, the first high thermal conduction members 89 and the second high thermal conduction member 90 may be disposed opposite the entire gap area between the resistive heat generators 56. The above-described structure improves the heat transfer efficiency of the part of the heater 23 corresponding to the gap area to be higher than the heat transfer efficiency of the other part of the heater 23. In FIG. 33, for the sake of convenience, the resistive heat generators 56, the first high thermal conduction members 89, and the second high thermal conduction member 90 are shifted in the vertical direction of FIG. 33 but are disposed at substantially the same position in the direction intersecting the longitudinal direction indicated by arrow Y. However, the present disclosure is not limited to the above. The first high thermal conduction member 89 and the second high thermal conduction member 90 may be disposed opposite a part of the resistive heat generators 56 in the direction intersecting the longitudinal direction or may be disposed so as to cover the entire resistive heat generators 56 in the direction intersecting the longitudinal direction.

Both the first high thermal conduction member 89 and the second high thermal conduction member 90 may be made of a graphene sheet. The first high thermal conduction member 89 and the second high thermal conduction member 90 made of the graphene sheet have high thermal conductivity in a predetermined direction along the plane of the graphene, that is, not in the thickness direction but in the longitudinal direction. Accordingly, the above-described structure can effectively reduce the temperature unevenness of the fixing belt 21 in the longitudinal direction and the temperature unevenness of the heater 23 in the longitudinal direction.

Figure 36:
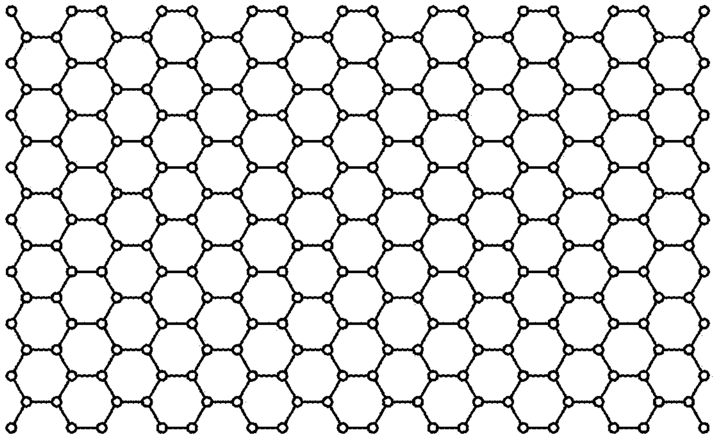
FIG. 36 is a schematic diagram illustrating a two dimensional atomic crystal structure of graphene.

Graphene is a flaky powder. Graphene has a planar hexagonal lattice structure of carbon atoms, as illustrated in FIG. 36. The graphene sheet is usually a single layer. The graphene sheet may be the single layer of carbon containing impurities. The graphene may have a fullerene structure. The fullerene structures are generally recognized as compounds including an even number of carbon atoms, which form a cage-like fused ring polycyclic system with five and six membered rings, including, for example, C60, C70, and C80 fullerenes or other closed cage structures having three-coordinate carbon atoms.

Graphene sheets are artificially made by, for example, a chemical vapor deposition (CVD) method.

The graphene sheet is commercially available. The size and thickness of the graphene sheet or the number of layers of the graphite sheet described later are measured by, for example, a transmission electron microscope (TEM).

Figure 37:
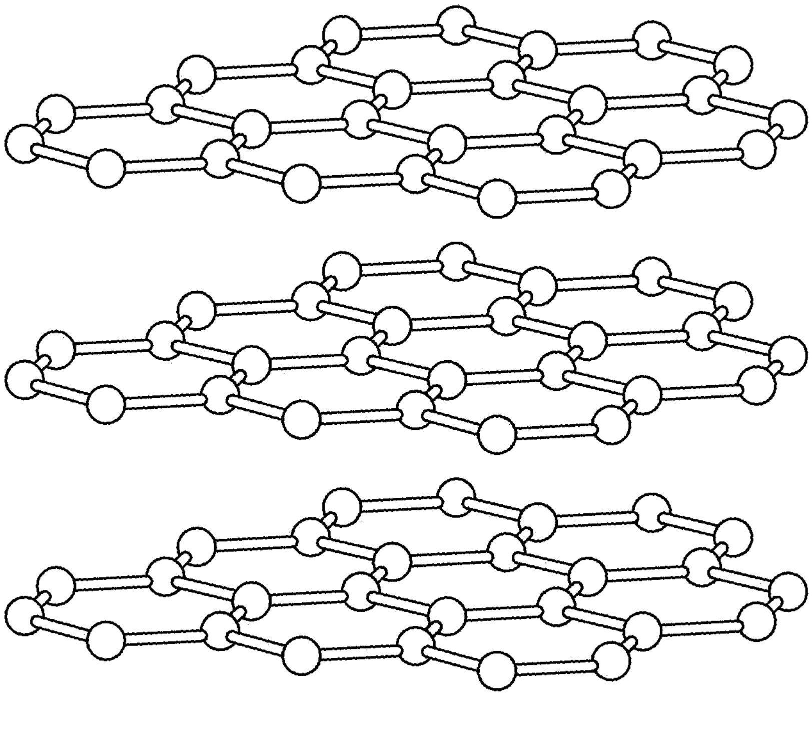
FIG. 37 is a schematic diagram illustrating a three dimensional atomic crystal structure of graphite.

Graphite obtained by multilayering graphene has a large thermal conduction anisotropy. As illustrated in FIG. 37, graphite has a crystal structure formed by layering a number of layers each having a condensed six membered ring layer plane of carbon atoms extending in a planar shape. Among carbon atoms in this crystal structure, adjacent carbon atoms in the layer are coupled by a covalent bond, and carbon atoms between layers are coupled by a van der Waals bond. The covalent bond has a larger bonding force than a van der Waals bond. Therefore, there is a large anisotropy between the bond between carbon atoms in a layer and the bond between carbon atoms in different layers. That is, the first high thermal conduction member 89 and the second high thermal conduction member 90 that are made of graphite each have the heat transfer efficiency in the longitudinal direction larger than the heat transfer efficiency in the thickness direction of the first high thermal conduction member 89 and the second high thermal conduction member 90 (that is, the stacking direction of these members), reducing the heat transferred to the heater holder 24. Accordingly, the above-described structure can efficiently decrease the temperature unevenness of the heater 23 in the longitudinal direction and can minimize the heat transferred to the heater holder 24. Since the first high thermal conduction member 89 and the second high thermal conduction member 90 that are made of graphite are not oxidized at about 700 degrees or lower, the first high thermal conduction member 89 and the second high thermal conduction member 90 each have an excellent heat resistance.

The physical properties and dimensions of the graphite sheet may be appropriately changed according to the function required for the first high thermal conduction member 89 or the second high thermal conduction member 90. For example, the anisotropy of the thermal conduction can be increased by using high-purity graphite or single-crystal graphite or increasing the thickness of the graphite sheet. Using a thin graphite sheet can reduce the thermal capacity of the fixing device so that the fixing device can perform high speed printing. A width of the first high thermal conduction member 89 or a width of the second high thermal conduction member 90 in the direction intersecting the longitudinal direction may be increased in response to a large width of the fixing nip N or a large width of the heater 23.

From the viewpoint of increasing mechanical strength, the number of layers of the graphite sheet is preferably 11 or more. The graphite sheet may partially include a single layer and a multilayer portion.

Figure 34:
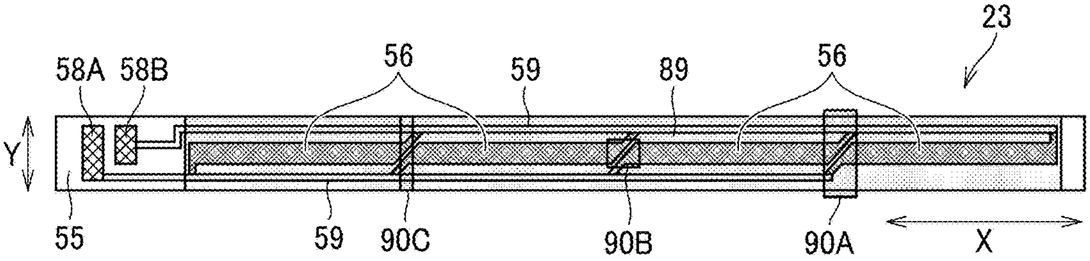
FIG. 34 is a plan view of the heater to illustrate other examples of arrangements of the second high thermal conduction member.

As long as the second high thermal conduction member 90 faces a part of each of the neighboring resistive heat generators 56 and at least a part of the gap area between the neighboring resistive heat generators 56, the configuration of the second high thermal conduction member 90 is not limited to the configuration illustrated in FIG. 32. For example, as illustrated in FIG. 34, a second high thermal conduction member 90A is longer than the base 55 in the direction intersecting the longitudinal direction indicated by arrow Y, and both ends of the second high thermal conduction member 90A in the direction intersecting the longitudinal direction are outside the base 55 in FIG. 34. A second high thermal conduction member 90B may face a range in which the resistive heat generators 56 are disposed in the direction intersecting the longitudinal direction. A second high thermal conduction member 90C faces a part of the gap area and a part of each of the neighboring resistive heat generators 56.

Figure 35:
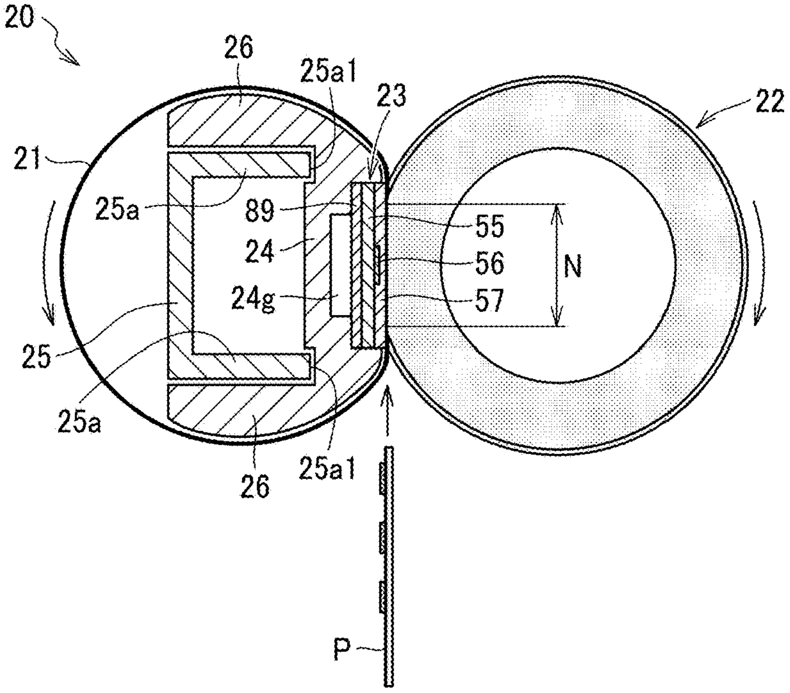
FIG. 35 is a schematic view of a fixing device having a configuration different from the fixing devices of FIGS. 2 and 13 to 16, 24, and 30.

The fixing device according to an embodiment illustrated in FIG. 35 has a gap between the first high thermal conduction member 89 and the heater holder 24 in the thickness direction that is the lateral direction in FIG. 35. In other words, the fixing device 9 has a gap **24*g* serving as a heat insulation layer in a part of a region of the recessed portion 24*a* (see FIG. 31) of the heater holder 24 in which the heater 23, the first high thermal conduction member 89, and the second high thermal conduction member 90 are disposed. The gap 24*g* is in the part of the region of the recessed portion 24*a* in the longitudinal direction, and the second high thermal conduction member 90 is not in the part. Therefore, FIG. 35 does not illustrate the second high thermal conduction member 90. The gap 24*g* has a depth deeper than the depth of the recessed portion 24*a* of the heater holder 24. The above-described structure minimizes the contact area between the heater holder 24 and the first high thermal conduction member 89. The gap 24*g* prevents heat transfer from the first high thermal conduction member 89 to the heater holder 24, and the heater 23 efficiently heats the fixing belt 21. In the cross section of the fixing device in which the second high thermal conduction member 90 is set, the second high thermal conduction member 90 is in contact with the heater holder 24 as illustrated in FIG. 30** of the above-described embodiment.

The gap **24*g* in the present embodiment in an entire area in which the resistive heat generators 56 are disposed in the direction intersecting the longitudinal direction that is the vertical direction in FIG. 35. The above-described configuration efficiently prevents heat transfer from the first high thermal conduction member 89 to the heater holder 24, and the heater 23 efficiently heats the fixing belt 21. The fixing device 9 may include a thermal insulation layer made of heat insulator having a lower thermal conductivity than the thermal conductivity of the heater holder 24 instead of a space like the gap 24*g*** serving as the thermal insulation layer.

In the present embodiment, the second high thermal conduction member 90 is a member different from the first high thermal conduction member 89, but the present embodiment is not limited to this. For example, the first high thermal conduction member 89 may have a thicker portion than the other portion so that the thicker portion faces the separation area B and functions as the second high thermal conduction member 90.

In the above, various configurations of the fixing device and the image forming apparatus in which the embodiments as illustrated in FIGS. 6 to 12 can be applied are described. Applying the embodiments to the various configurations of the fixing device and the image forming apparatus give effects similar to the above-described effects in the embodiments. That is, applying the present embodiments to the fixing device reduces variations in the temperatures of the heater and the belt and improves the fixing quality.

In the above-described embodiments, the present disclosure is applied to the fixing device that is an example of the heating device. A heating device in which the present embodiments can be applied is not limited to the fixing device. The heating device in which the present embodiments can be applied is also applicable to, for example, a heating device such as a dryer to dry liquid such as ink applied to the sheet, a laminator that heats, under pressure, a film serving as a covering member onto the surface of the sheet such as paper, and a thermocompression device such as a heat sealer that seals a seal portion of a packaging material with heat and pressure.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

What is claimed is:

1. A heating device comprising:
a first rotator;
a heater configured to heat the first rotator, the heater including:
a base having one edge and the other edge in a longitudinal direction of the base; and
a heat generator being adjacent to the base and defining a heat generation area, the heat generation area having one edge and the other edge in the longitudinal direction, the one edge of the heat generation area being closer to the one edge of the base than to the other edge of the heat generation area,
the heater having a length between the one edge of the base and the one edge of the heat generation area in the longitudinal direction longer than a length between the other edge of the base and the other edge of the heat generation area in the longitudinal direction; and
a second rotator configured to contact an outer circumferential surface of the first rotator to form a nip, the second rotator having one edge and the other edge in the longitudinal direction, the one edge of the second rotator being closer to the one edge of the heat generation area than to the other edge of the second rotator,
the second rotator positioned to have a length between the one edge of the second rotator and the one edge of the heat generation area in the longitudinal direction shorter than a length between the other edge of the second rotator and the other edge of the heat generation area in the longitudinal direction.

2. The heating device according to claim 1, further comprising
an electrode disposed between the one edge of the base and the one edge of the heat generation area and coupled to the heat generator,
wherein no electrode is disposed between the other edge of the base and the other edge of the heat generation area.

3. The heating device according to claim 1, further comprising
a high-friction portion being closer to the other edge of the second rotator than to the one edge of the second rotator and being on at least one of the first rotator or the second rotator.

4. The heating device according to claim 3,
wherein the second rotator includes an elastic layer and a surface layer disposed on an outer circumferential surface of the elastic layer,
wherein the high-friction portion includes an exposed portion of the elastic layer not covered with the surface layer.

5. The heating device according to claim 1,
wherein a length between one edge of a sheet passing region defined by a sheet passing through the nip in the longitudinal direction of the base and the one edge of the heat generation area in the longitudinal direction is longer than a length between the other edge of the sheet passing region and the other edge of the heat generation area.

6. The heating device according to claim 1,
wherein the heater includes a central heat generator, a one-side heat generator closer to the one edge of the heat generation area than to the central heat generator, and an other-side heat generator closer to the other edge of the heat generation area than to the central heat generator in the longitudinal direction, and
wherein a length of the one-side heat generator in the longitudinal direction is longer than a length of the other-side heat generator in the longitudinal direction.

7. A fixing device comprising
the heating device according to claim 1.

8. An image forming apparatus comprising
the heating device according to claim 1.

* * * * *